(12) United States Patent
Jen et al.

(10) Patent No.: US 8,252,265 B2
(45) Date of Patent: Aug. 28, 2012

(54) METHOD FOR MAKING A CHALCOPYRITE-TYPE COMPOUND

(75) Inventors: Chung-Chi Jen, Kaohsiung (TW);
Wen-Hao Yuan, Kaohsiung (TW);
Bang-Yen Chou, Kaohsiung (TW);
Yen-Liang Tu, Kaohsiung (TW);
Chiu-Kung Huang, Kaohsiung (TW);
Jun-Shing Chiou, Kaohsiung (TW);
Tzo-Ing Lin, Kaohsiung (TW)

(73) Assignee: Nanowin Technology Co., Ltd. (TW)

( * ) Notice: Subject to any disclaimer, the term of this patent is extended or adjusted under 35 U.S.C. 154(b) by 52 days.

(21) Appl. No.: 13/009,934

(22) Filed: Jan. 20, 2011

(65) Prior Publication Data

US 2012/0189531 A1    Jul. 26, 2012

(51) Int. Cl.
*C01B 17/00* (2006.01)
*C01B 17/20* (2006.01)
*C01B 19/00* (2006.01)
*C01B 19/04* (2006.01)

(52) U.S. Cl. ...... 423/508; 423/509; 423/511; 423/561.1

(58) Field of Classification Search .......... 423/508, 423/509, 511, 561.1
See application file for complete search history.

(56) References Cited

U.S. PATENT DOCUMENTS

| | | | |
|---|---|---|---|
| 7,267,810 B2 * | 9/2007 | Yu et al. | 423/508 |
| 7,566,435 B2 * | 7/2009 | Chen et al. | 423/566.1 |
| 7,829,059 B2 * | 11/2010 | Guo et al. | 423/508 |
| 7,914,762 B2 * | 3/2011 | Hwang et al. | 423/508 |
| 7,955,586 B2 * | 6/2011 | Jung et al. | 423/508 |
| 7,985,388 B2 * | 7/2011 | Shen et al. | 423/1 |

* cited by examiner

*Primary Examiner* — Timothy Vanoy
(74) *Attorney, Agent, or Firm* — Ostrolenk Faber LLP

(57) ABSTRACT

A method for making a chalcopyrite-type compound includes: reacting a reaction mixture in a first solvent under reflux condition to form the chalcopyrite-type compound containing $M^1$, $M^2$, and A, in which $M^1$ is selected from Cu, Au, Ag, Na, Li, and K, $M^2$ is selected from In, Ga, Al, Ti, Zn, Cd, Sn, Mg, and combinations thereof, and A is selected from S, Se, Te, and combinations thereof; filtering the reaction mixture to obtain a crude cake; mixing the crude cake with a second solvent and a powder of a post-treatment material selected from S, Se, Te, and combinations thereof; and heating the mixture under reflux condition.

13 Claims, 22 Drawing Sheets

METHOD FOR MAKING A CHALCOPYRITE-TYPE COMPOUND

BACKGROUND OF THE INVENTION

1. Field of the Invention

This invention relates to a method for making a chalcopyrite-type compound, more particularly to a method involving a post treatment of a crude product of a chalcopyrite-type compound.

2. Description of the Related Art

Chalcopyrite-type compounds, such as $CuInSe_2$, $Cu(In_xGa_{1-x})(Se_yS_{2-y})$, and $Cu(In_xAl_{1-x})(Se_yS_{2-y})$, are used in the production of a semiconductor absorption layer of a solar cell due to their high optoelectric efficiency and low cost. The amount of impurities, such as the carbon content, contained in the chalcopyrite-type compound has a significantly adverse effect on the optoelectric efficiency thereof. It is desirable to manufacture a chalcopyrite-type compound having a low impurity content.

Bin Li et al. (Adv. Mater., 1999, 11, No. 17, 1456-1459) disclose a solvothermal synthesis method for making $CuInSe_2$ nano-materials. The method involves reacting a mixture of $CuCl_2.2H_2O$, $InCl_3.4H_2O$ and Se powder in a solvent of ethylenediamine at a temperature of 180° C. for 15 hr to form a precipitate. The precipitate thus formed is rinsed with an aqueous solution containing water and ethanol so as to remove by-product from the precipitate, followed by drying so as to form the chalcopyrite-type compound powder having a structure of a chalcopyrite phase. The chalcopyrite-type compound thus formed has a high carbon impurity content.

U.S. Pat. No. 7,591,990 discloses a process for making a chalcopyrite-type compound of formula $M^3M^1A_2$, where $M^1$ can be selected from $Al^{3+}$, $Ga^{3+}$, $In^{3+}$, etc., $M^3$ can be selected from $Cu^+$, $Ag^+$, etc., and A can be selected from S, Se, and Te. The process comprises reacting a compound of formula $M^3X$ with a compound of formula $M^2M^1A_2$ in a coordinating solvent so as to form the chalcopyrite-type compound of formula $M^3M^1A_2$, where X can be a halide and $M^2$ can be $Li^+$, $Na^+$, $K^+$, etc. The reaction product of the chalcopyrite-type compound thus formed also has a relatively high impurity content.

SUMMARY OF THE INVENTION

Therefore, an object of the present invention is to provide a method for making a chalcopyrite-type compound that can reduce the impurity of the chalcopyrite-type compound.

According to the present invention, a method for making a chalcopyrite-type compound comprises: reacting a reaction mixture in a first solvent under reflux condition to form the chalcopyrite-type compound containing $M^1$, $M^2$, and A, in which $M^1$ is selected from Cu, Au, Ag, Na, Li, and K, $M^2$ is selected from In, Ga, Al, Ti, Zn, Cd, Sn, Mg, and combinations thereof, and A is selected from S, Se, Te, and combinations thereof; filtering the reaction mixture after the reaction so as to obtain a crude cake of the chalcopyrite-type compound; mixing the crude cake with a second solvent and a powder of a post-treatment material selected from S, Se, Te, and combinations thereof so as to form a treatment mixture; and heating the treatment mixture under reflux condition in a manner to permit the crude cake to undergo a post treatment for removing impurities from the crude cake.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 1:
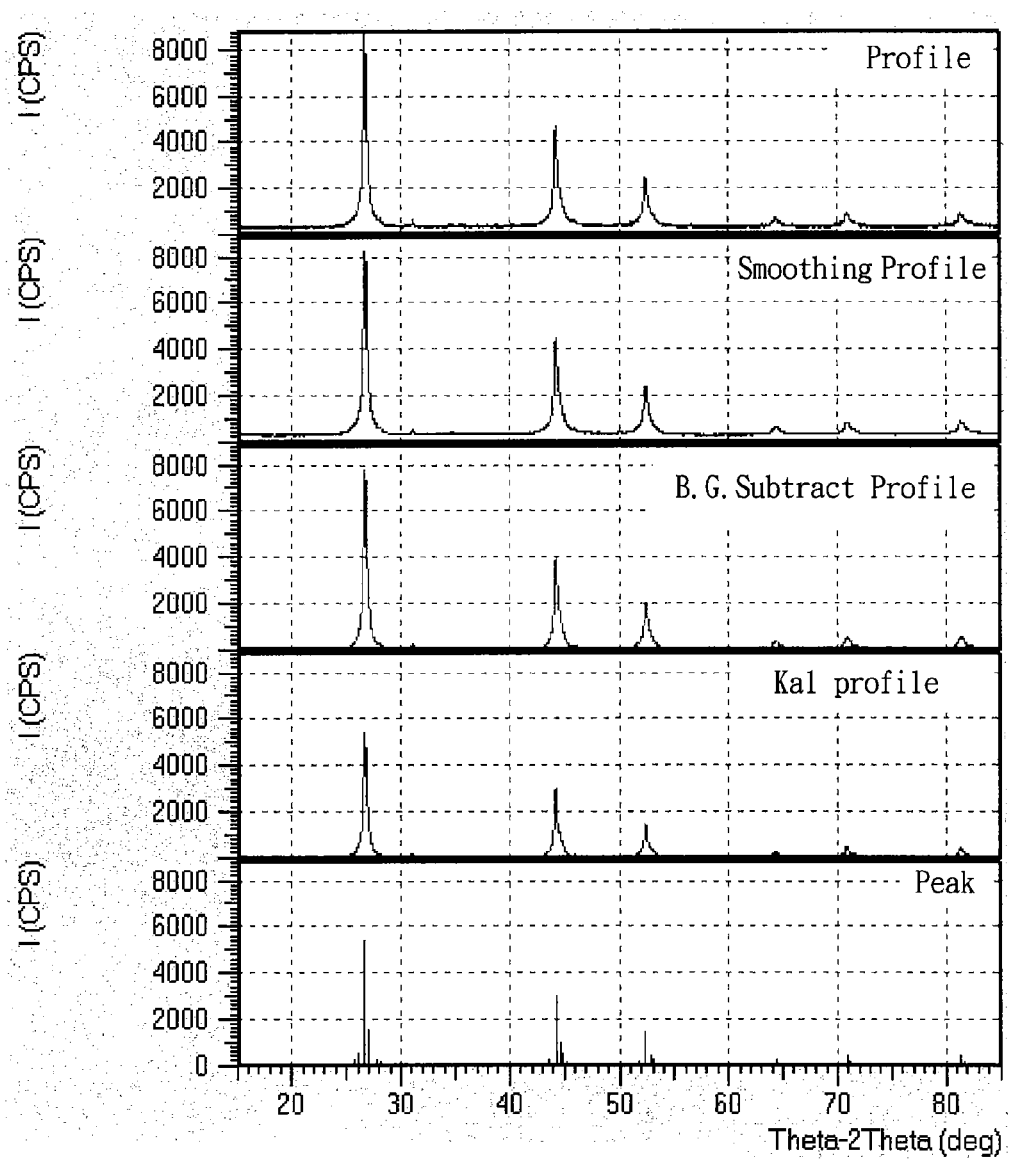
FIG. 1 shows an X-ray diffraction pattern of the product (c) of Example 1 before a post treatment in a method of the preferred embodiment according to this invention.

The preferred embodiment of a method for making a chalcopyrite-type compound according to this invention includes: reacting a reaction mixture in a first solvent under reflux condition to form the chalcopyrite-type compound containing $M^1$, $M^2$, and A, in which $M^1$ is selected from Cu, Au, Ag, Na, Li, and K, $M^2$ is selected from In, Ga, Al, Ti, Zn, Cd, Sn, Mg, and combinations thereof, and A is selected from S, Se, Te, and combinations thereof; filtering the reaction mixture after the reaction so as to obtain a crude cake of the chalcopyrite-type compound; mixing the crude cake with a second solvent and a powder of a post-treatment material selected from S, Se, Te, and combinations thereof so as to form a treatment mixture; and heating the treatment mixture under reflux condition in a manner to permit the crude cake to undergo a post treatment for removing impurities from the crude cake.

The reaction includes at least one first compound and at least one second compound, the first compound containing $M^1$ and $A^1$, the second compound containing $M^2$ and $A^1$, in which $A^1$ is selected from S, Se, Te, $Cl^-$, $Br^-$, $I^-$, $OH^-$, $NO_3^-$, $SO_4^{2-}$, $CH_3COO^-$, acetylacetonate, and combinations of S, Se, and Te; and wherein, when $A^1$ of the first and second compounds is not S, Se, Te, or the combinations of S, Se, and Te, the reaction mixture further includes a powder of material selected from the group consisting of S, Se, Te, and combinations thereof.

The preferred embodiment further comprises washing the crude cake with a washing solution containing water, alcohol and ketone before mixing with the second solvent and the powder of the post-treatment material for the post treatment, followed by drying the crude cake.

Preferably, the preferred embodiment of this invention further comprises washing the crude cake of the chalcopyrite-type compound with an acid after the post-treatment, followed by a second washing with the washing solution and drying the crude cake.

Suitable examples of the first and second solvents are alkylamines, dimethyl foramide (DMF), N-methylpyrolidone (NMP), methylimidazole, dimethyl sulfoxide (DMSO), oleylamine, glycerol, and ethyleneglycol. In the embodiments of this invention, each of the first and second solvents is independently selected from ethylenediamine and methylimidazole.

Suitable examples of the acid includes nitric acid, hydrochloric acid, citric acid, acetic acid, phosphoric acid, sulfuric acid, and oxalic acid. Preferably, when a strong acid is used, the concentration of the strong acid ranges from 5-10 wt %.

The merits of the method for making the chalcopyrite-type compound of this invention will become apparent with reference to the following Examples and Comparative Examples. The present invention is not restricted to the following Examples.

Example 1 (E1)

Preparation of $In_2Se_3$ 4000 ml of ethylenediamine was added into a reactor. 302.5 g of Se powder was added into the reactor with stirring. The mixture in the reactor was stirred for 5 minutes. 750.5 g of $InCl_3 \cdot 4H_2O$ was slowly added into the reactor with stirring. The mixture in the reactor was stirred for 20 minutes before heating and was heated to a boiling point thereof with stirring for reaction of the mixture to take place. The reaction of the mixture lasted under reflux condition for 30 hrs. The mixture was filtered to obtain a crude cake of $In_2Se_3$ after the reaction was completed and the mixture was cooled. The crude cake was washed with a solution containing a large amount of water, 2 L (Liter) of ethanol and 2 L of acetone, followed by drying at a temperature of 150° C. A yellow powder (product (a)) of $In_2Se_3$ having a composition of 42.63 at % In and 57.37 at % Se was obtained. Elemental analysis shows that the yellow powder contains an impurity of 4.81 wt % of carbon.

Preparation of $Cu_2Se$ 5500 ml of ethylenediamine was added into a reactor. 231 g of Se powder was added into the reactor with stirring. The mixture in the reactor was stirred for 5 minutes. 580 g of CuCl was slowly added into the reactor with stirring. The mixture in the reactor was stirred for 5 minutes before heating and was heated to a boiling point thereof with stirring for reaction of the mixture to take place. The reaction of the mixture lasted under reflux condition for 24 hrs. The mixture was filtered to obtain a crude cake of $Cu_2Se$ after the reaction was completed and the mixture was cooled. The crude cake was washed with a solution containing a large amount of water, 2 L of ethanol and 2 L of acetone, followed by drying at a temperature of 150° C. A dark blue powder (product (b)) of $Cu_2Se$ having a composition of 63.82 at % Cu and 36.18 at % Se was obtained. Elemental analysis shows that the dark blue powder contains an impurity of 0.1 wt % of carbon.

Preparation of Ternary Compound $CuInSe_2$ 9000 ml of ethylenediamine was added into a reactor. 600 g of product (a) and 260 g of product (b) were added into the reactor with stirring. The mixture in the reactor was stirred for 5 minutes before heating and was subsequently heated to a boiling point thereof with stirring for reaction of the mixture to take place. The reaction of the mixture lasted under reflux condition for 30 hrs. The mixture was filtered to obtain a crude cake of $CuInSe_2$ after the reaction was completed and the mixture was cooled. The crude cake was washed with a solution containing a large amount of water, 2 L of ethanol and 2 L of acetone, followed by drying at a temperature of 150° C. A black powder (product (c)) of $CuInSe_2$ having a composition of 25.43 at % Cu, 26.68 at % In and 47.89 at % Se was obtained. Elemental analysis shows that the black powder contains an impurity of 1.536 wt % of carbon. FIG. 1 shows the X-ray diffraction (XRD) pattern of the black powder (product (c)).

Removal of Impurity from Product (c)

Figure 2:
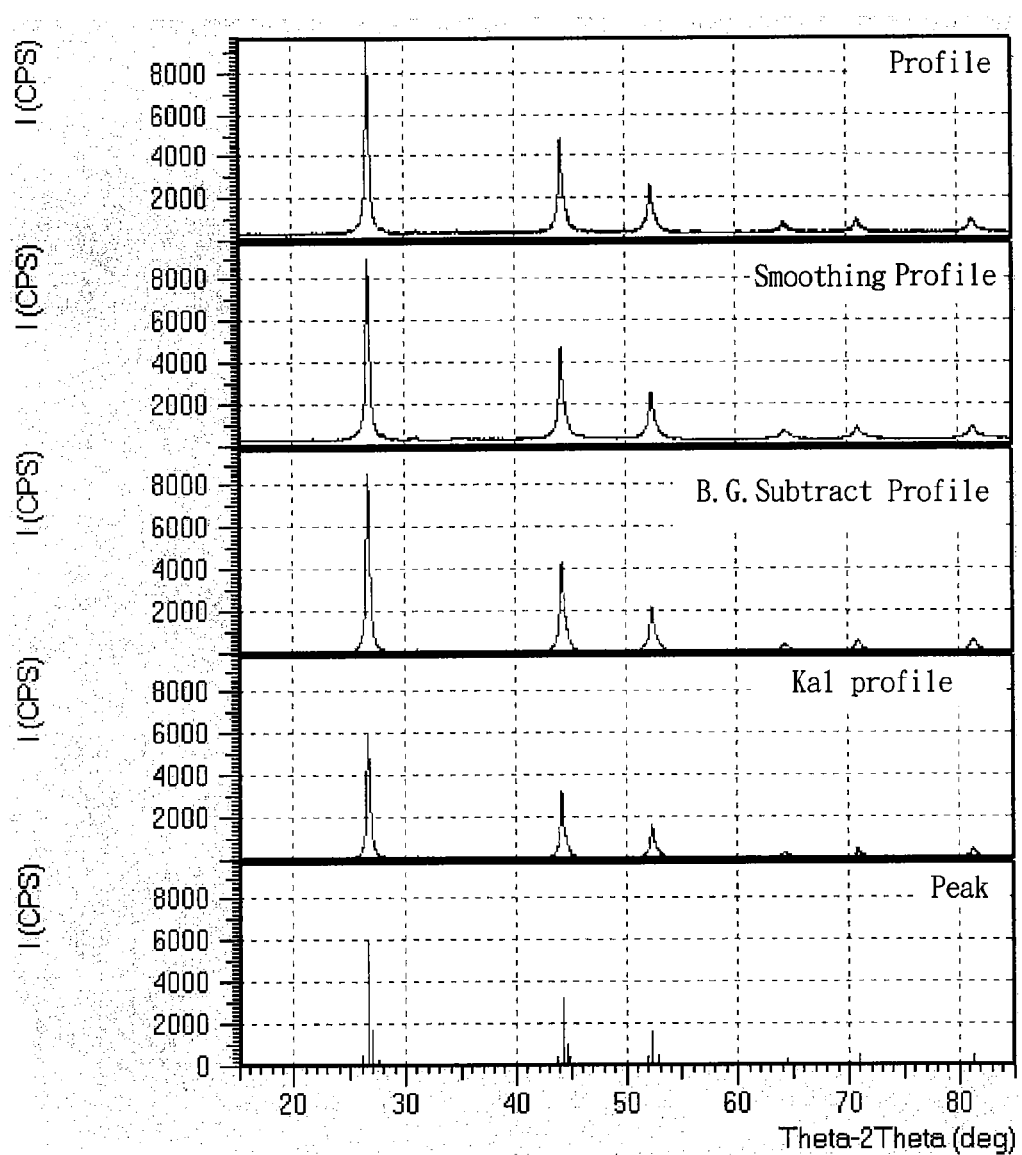
FIG. 2 shows an X-ray diffraction pattern of the product (d) of Example 1 after the post treatment.

6000 ml of ethylenediamine was added into a reactor. 730 g of product (c) and 44 g of Se powder were added into the reactor with stirring. The mixture in the reactor was stirred for 5 minutes before heating and was subsequently heated to its boiling point with stirring for 40 hrs for conducting a post treatment of the product (c) of the mixture under reflux condition. The mixture was filtered to obtain a crude cake of $CuInSe_2$ after the post treatment was completed and the mixture was cooled. The crude cake was washed with a solution containing a large amount of water, 2 L of ethanol and 2 L of acetone, followed by drying at a temperature of 150° C. A black powder (product (d)) of $CuInSe_2$ having a composition of 25.44 at % Cu, 26.67 at % In, and 47.88 at % Se was obtained. Elemental analysis shows that the black powder contains an impurity of 0.877 wt % of carbon. FIG. 2 shows the X-ray diffraction (XRD) pattern of the black powder (product (d)).

The post treatment of product (c) permits a significant reduction of the carbon content of the $CuInSe_2$ product from 1.536 wt % (product (c)) to 0.877 wt % (product (d)).

Removal of Impurity from Product (d)

Figure 3:
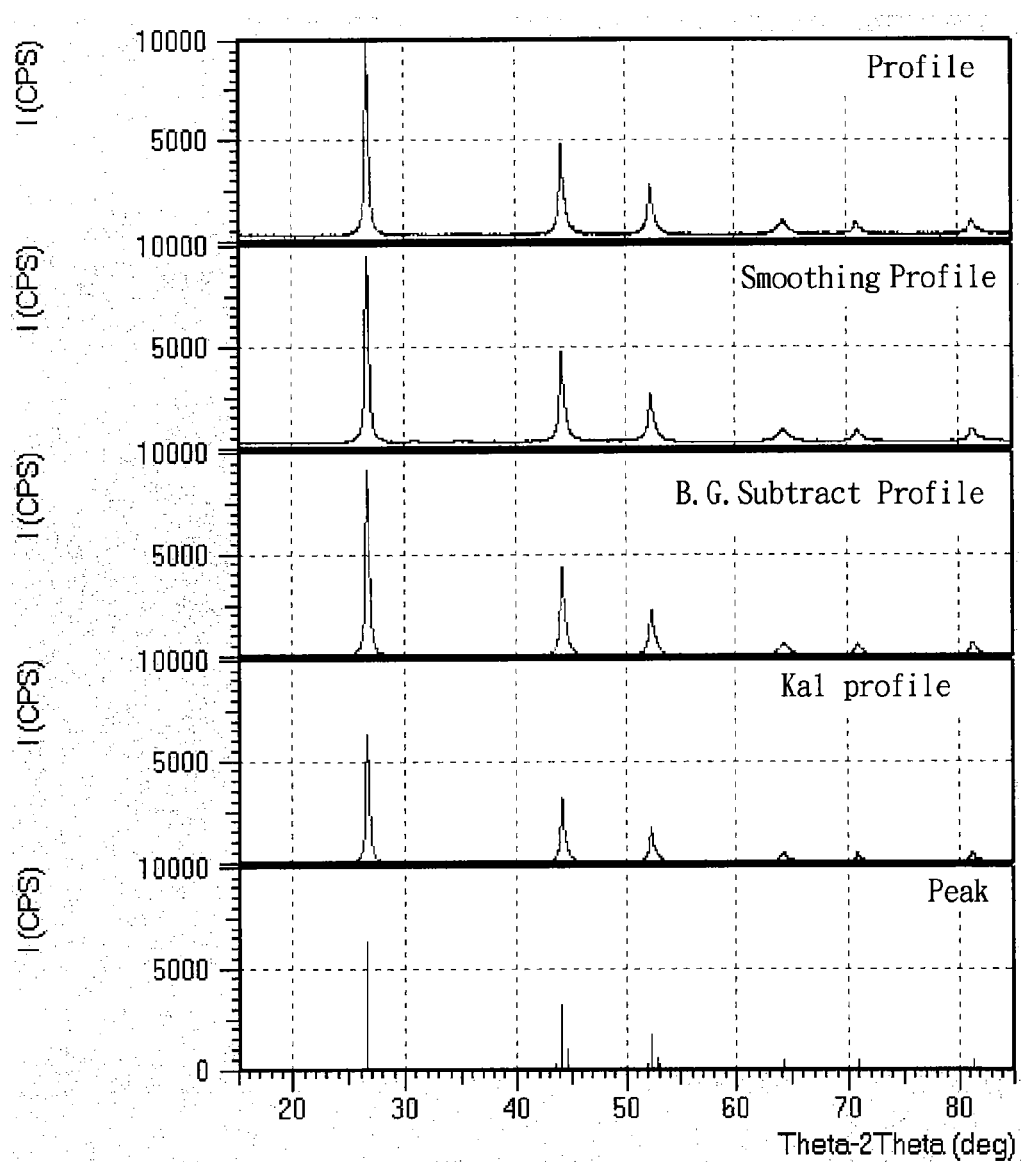
FIG. 3 shows an X-ray diffraction pattern of the product (e) of Example 1 after the post treatment and an acid washing.

5400 ml of 5% nitric acid was added into a reactor. 650 g of product (d) was added into the reactor with stirring. The mixture was subsequently heated to 45° C. with stirring for 4 hrs. The mixture was filtered to obtain a crude cake of $CuInSe_2$ after the treatment was completed and the mixture was cooled. The crude cake was washed with a solution containing a large amount of water, 2 L of ethanol and 2 L of acetone, followed by drying at a temperature of 150° C. A black powder (product (e)) of $CuInSe_2$ having a composition of 26.29 at % Cu, 25.45 at % In, and 48.26 at % Se was obtained. Elemental analysis shows that the black powder contains an impurity of 0.713 wt % of carbon. FIG. 3 shows the X-ray diffraction (XRD) pattern of the black powder (product (e)).

Example 2 (E2)

Figure 4:
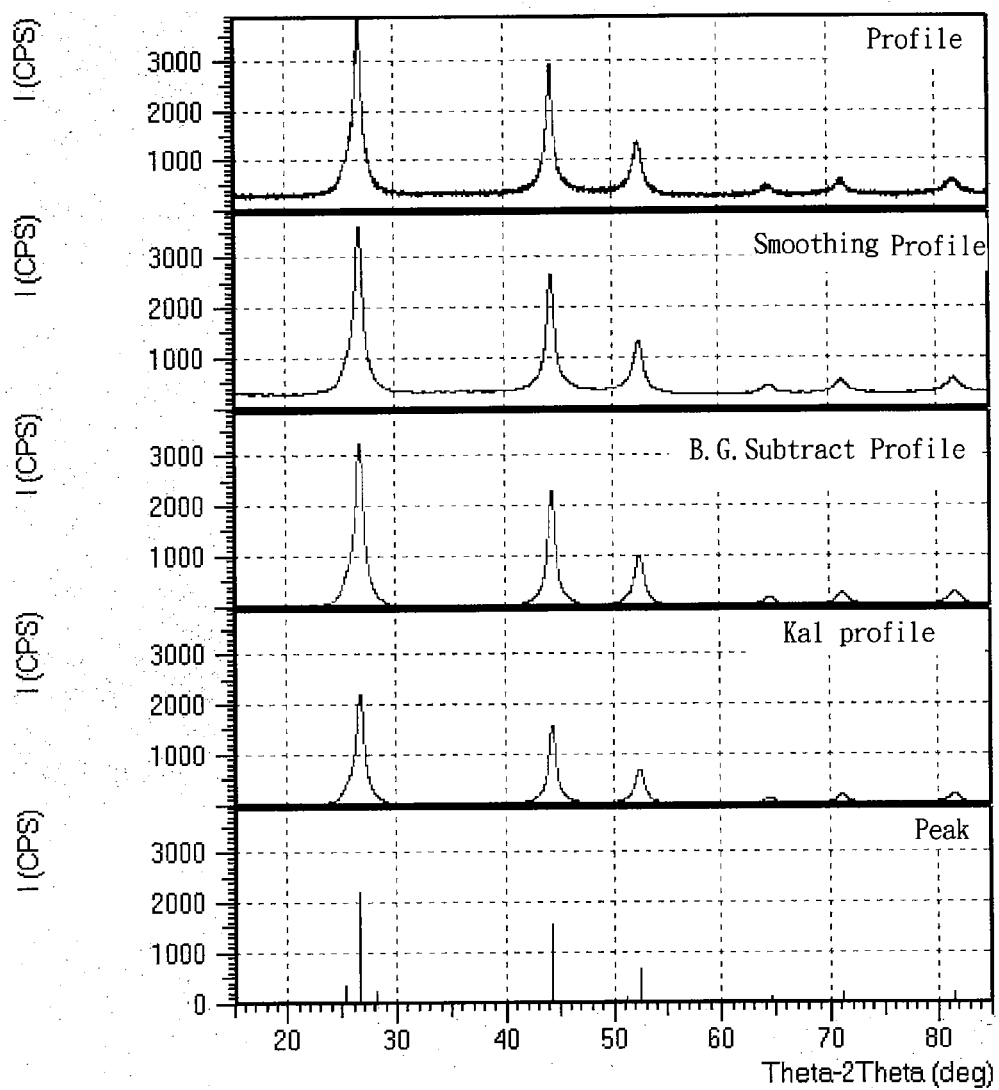
FIG. 4 shows an X-ray diffraction pattern of the product (f) of Example 2 before a post treatment.

Preparation of Quarternary Compound CuInGaSe$_2$ 350 ml of ethylenediamine was added into a reactor. 6 g of product (a), 11.95 g of product (b) and 1.31 g Ga$_2$Se$_3$ were added into the reactor with stirring. The mixture in the reactor was stirred for 5 minutes before heating and was subsequently heated to a boiling point thereof with stirring for reaction of the mixture to take place. The reaction of the mixture lasted under reflux condition for 50 hrs. The mixture was filtered to obtain a crude cake of CuInGaSe$_2$ after the reaction was completed and the mixture was cooled. The crude cake was washed with a solution containing a large amount of water, 2 L of ethanol and 2 L of acetone, followed by drying at a temperature of 150° C. A black powder (product (f)) of CuInGaSe$_2$ having a composition of 24.4 at % Cu, 21.6 at % In, 6.48 at % Ga, and 47.52 at % Se was obtained. Elemental analysis shows that the black powder contains an impurity of 1.332 wt % of carbon. FIG. 4 shows the X-ray diffraction (XRD) pattern of the black powder (product (f)).

Removal of Impurity from Product (f)

Figure 5:
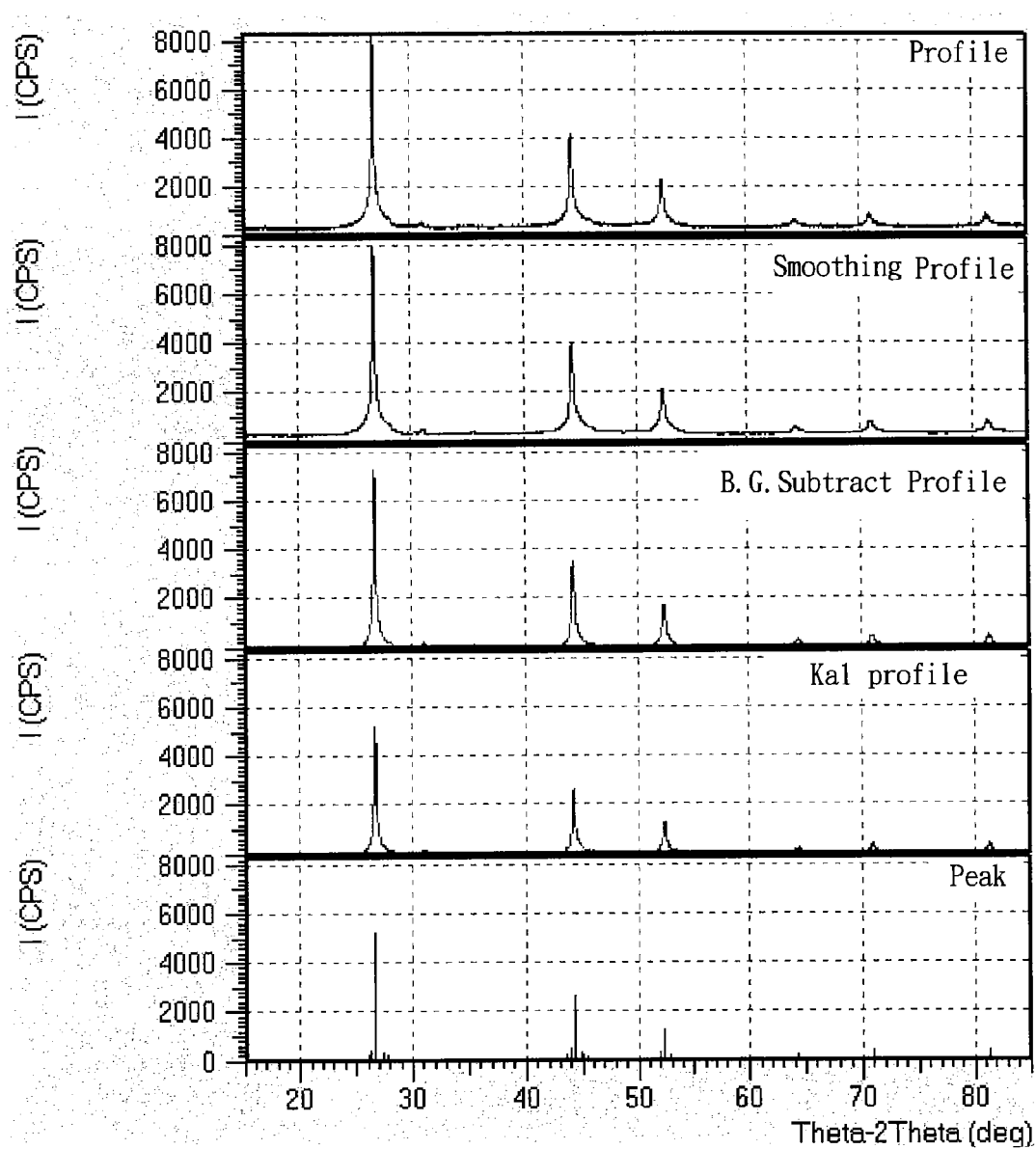
FIG. 5 shows an X-ray diffraction pattern of the product (g) of Example 2 after the post treatment.

200 ml of ethylenediamine was added into a reactor. 15 g of product (f) and 0.9 g of Se powder were added into the reactor with stirring. The mixture in the reactor was stirred for 5 minutes before heating and was subsequently heated to its boiling point with stirring for 98 hrs for conducting a post treatment of the product (f) of the mixture under reflux condition. The mixture was filtered to obtain a crude cake of CuInGaSe$_2$ after the post treatment was completed and the mixture was cooled. The crude cake was washed with a solution containing a large amount of water, 2 L of ethanol and 2 L of acetone, followed by drying at a temperature of 150° C. A black powder (product (g)) of CuInGaSe$_2$ having a composition of 23.5 at % Cu, 22.28 at % In, 6.49 at % Ga, and 47.73 at % Se was obtained. Elemental analysis shows that the black powder contains an impurity of 0.65 wt % of carbon. FIG. 5 shows the X-ray diffraction (XRD) pattern of the black powder (product (g)).

Removal of Impurity from Product (g)

Figure 6:
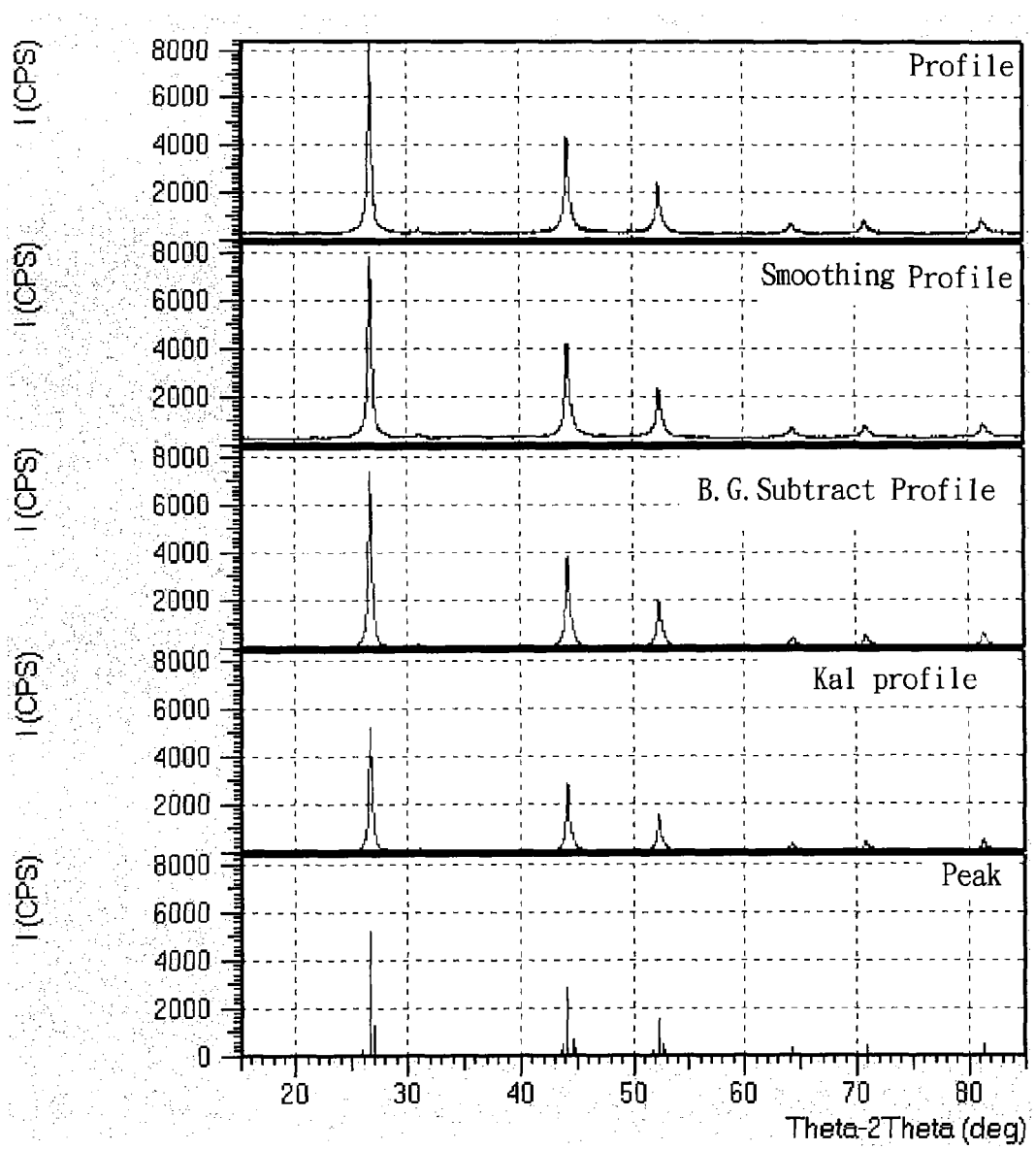
FIG. 6 shows an X-ray diffraction pattern of the product (h) of Example 2 after the post treatment and an acid washing.

85 ml of 5% nitric acid was added into a reactor. 10 g of product (g) was added into the reactor with stirring. The mixture was subsequently heated to 45° C. with stirring for 4 hrs. The mixture was filtered to obtain a crude cake of CuInGaSe$_2$ after the treatment was completed and the mixture was cooled. The crude cake was washed with a solution containing a large amount of water, 2 L of ethanol and 2 L of acetone, followed by drying at a temperature of 150° C. A black powder (product (h)) of CuInGaSe$_2$ having a composition of 23.9 at % Cu, 22.23 at % In, 6.55 at % Ga, and 47.32 at % Se was obtained. Elemental analysis shows that the black powder contains an impurity of 0.511 wt % of carbon. FIG. 6 shows the X-ray diffraction (XRD) pattern of the black powder (product (h)).

Example 3 (E3)

Figure 7:
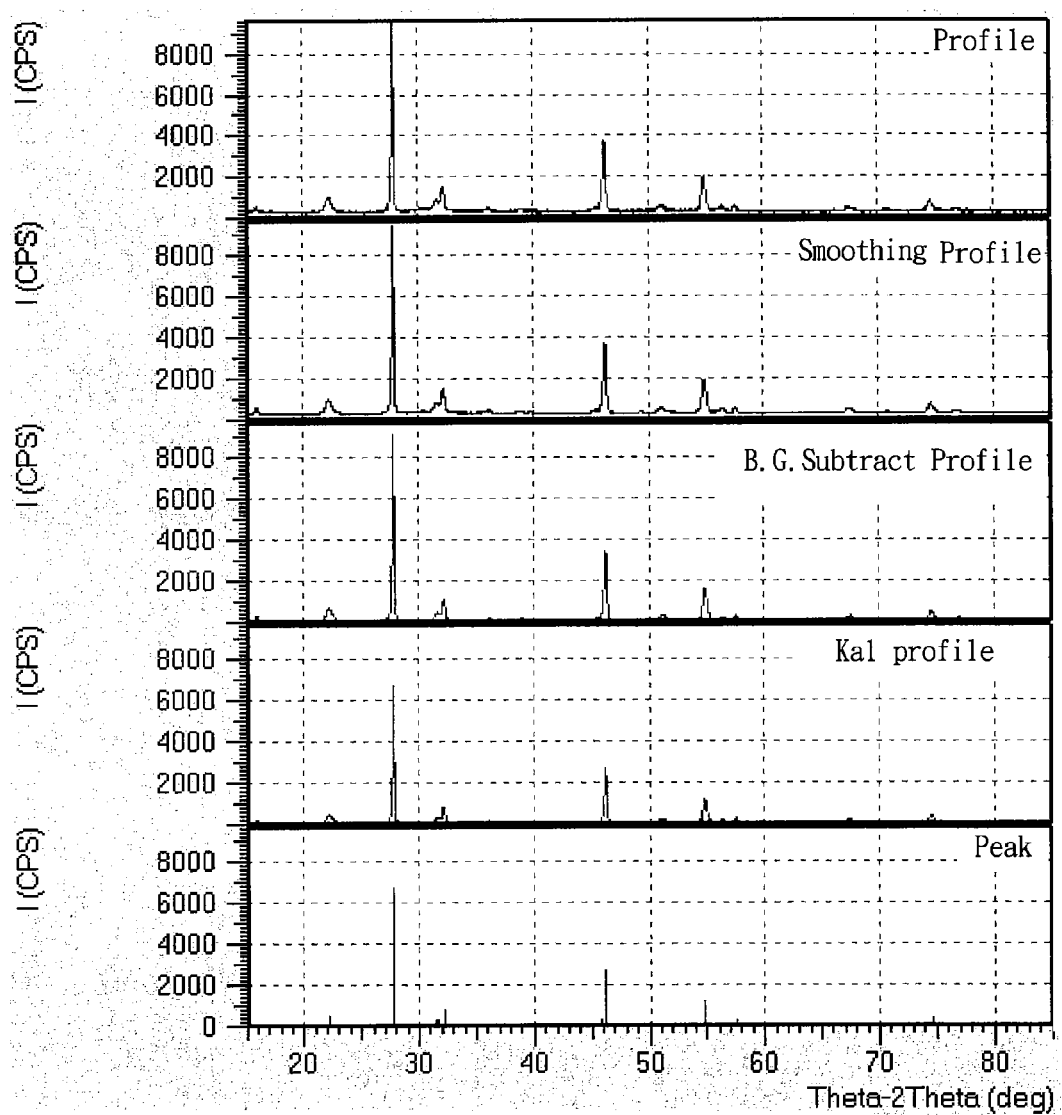
FIG. 7 shows an X-ray diffraction pattern of the product (i) of Example 3 before a post treatment.

Preparation of Five-Element Compound CuInGaSeS 350 ml of ethylenediamine was added into a reactor. 6 g of product (b), 8.35 g of In$_2$S$_3$, and 1.31 g Ga$_2$Se$_3$ were added into the reactor with stirring. The mixture in the reactor was stirred for 5 minutes before heating and was subsequently heated to a boiling point thereof with stirring for reaction of the mixture to take place. The reaction of the mixture lasted under reflux condition for 50 hrs. The mixture was filtered to obtain a crude cake of CuInGaSeS after the reaction was completed and the mixture was cooled. The crude cake was washed with a solution containing a large amount of water, 2 L of ethanol and 2 L of acetone, followed by drying at a temperature of 150° C. A black powder (product (i)) of CuInGaSeS having a composition of 25.4 at % Cu, 19.68 at % In, 6.82 at % Ga, 18.1 at % Se, and 30 at % S was obtained. Elemental analysis shows that the black powder contains an impurity of 0.928 wt % of carbon. FIG. 7 shows the X-ray diffraction (XRD) pattern of the black powder (product (i)).

Removal of Impurity from Product (i)

Figure 8:
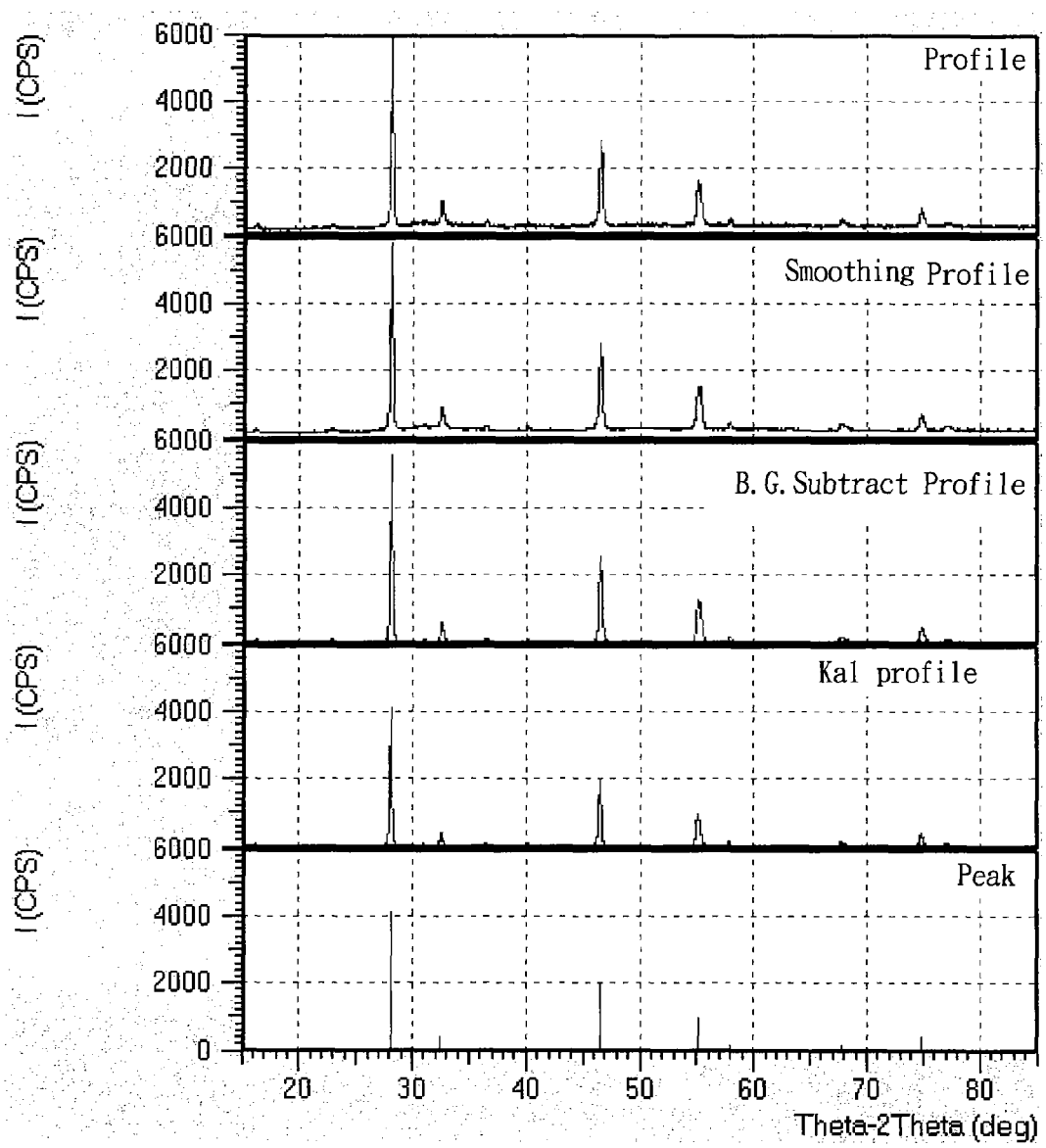
FIG. 8 shows an X-ray diffraction pattern of the product (j) of Example 3 after the post treatment.

200 ml of ethylenediamine was added into a reactor. 13 g of product (i) and 0.9 g of Se powder were added into the reactor with stirring. The mixture in the reactor was stirred for 5 minutes before heating and was subsequently heated to its boiling point with stirring for 48 hrs for conducting a post treatment of the product (i) of the mixture under reflux condition. The mixture was filtered to obtain a crude cake of CuInGaSeS after the post treatment was completed and the mixture was cooled. The crude cake was washed with a solution containing a large amount of water, 2 L of ethanol and 2 L of acetone, followed by drying at a temperature of 150° C. A black powder (product (j)) of CuInGaSeS having a composition of 24.9 at % Cu, 20.1 at % In, 6.7 at % Ga, 18.5 at % Se, and 29.8 at % S was obtained. Elemental analysis shows that the black powder contains an impurity of 0.522 wt % of carbon. FIG. 8 shows the X-ray diffraction (XRD) pattern of the black powder (product (j)).

Removal of Impurity from Product (j)

Figure 9:
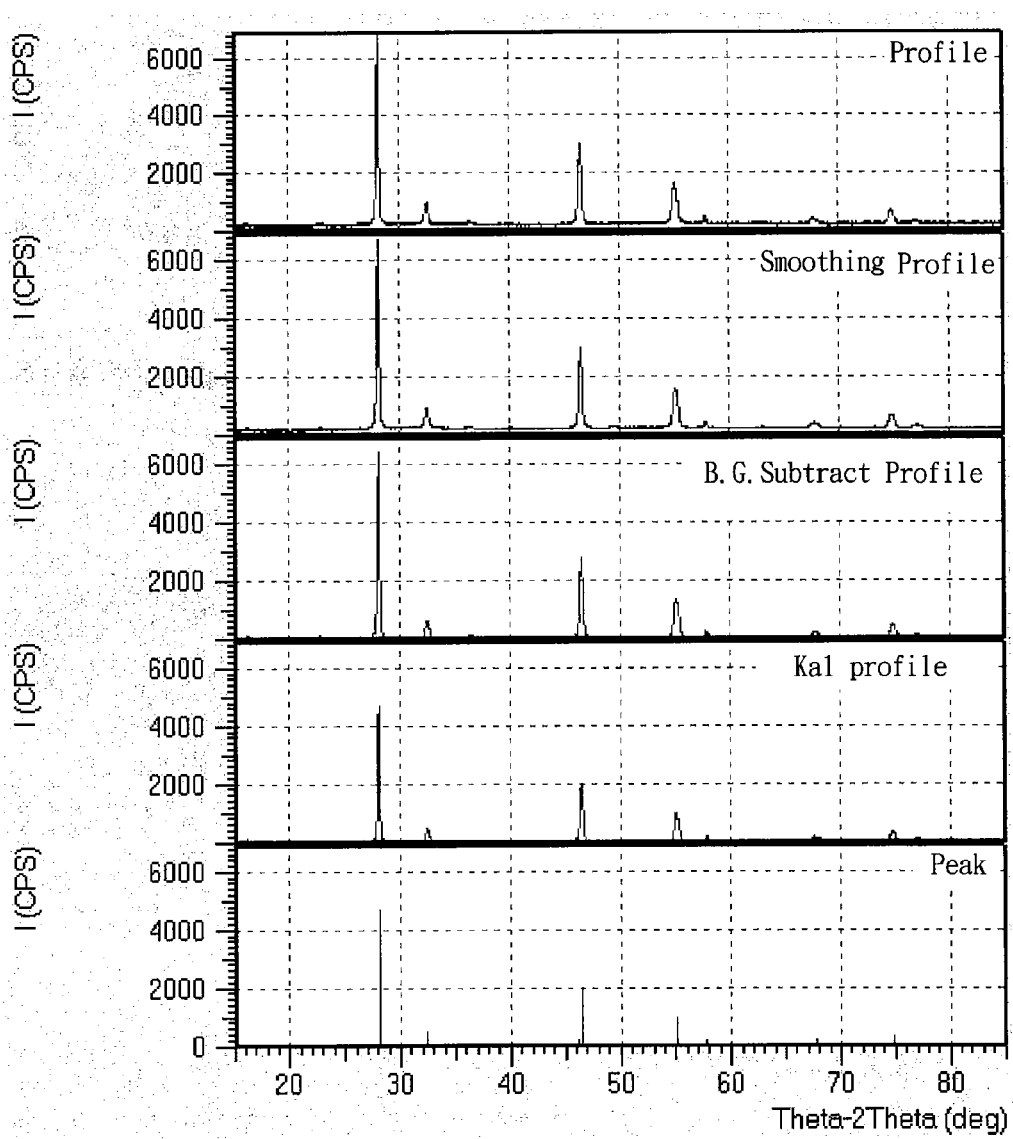
FIG. 9 shows an X-ray diffraction pattern of the product (k) of Example 3 after the post treatment and an acid washing.

100 ml of 5% nitric acid was added into a reactor. 12 g of product (j) was added into the reactor with stirring. The mixture was subsequently heated to 48° C. with stirring for 4 hrs. The mixture was filtered to obtain a crude cake of CuInGaSeS after the treatment was completed and the mixture was cooled. The crude cake was washed with a solution containing a large amount of water, 2 L of ethanol and 2 L of acetone, followed by drying at a temperature of 150° C. A black powder (product (k)) of CuInGaSeS having a composition of 24.83 at % Cu, 19.82 at % In, 6.75 at % Ga, 17.41 at % Se, and 31.19 at % S was obtained. Elemental analysis shows that the black powder contains an impurity of 0.331 wt % of carbon. FIG. 9 shows the X-ray diffraction (XRD) pattern of the black powder (product (k)).

Example 4 (E4)

Figure 10:
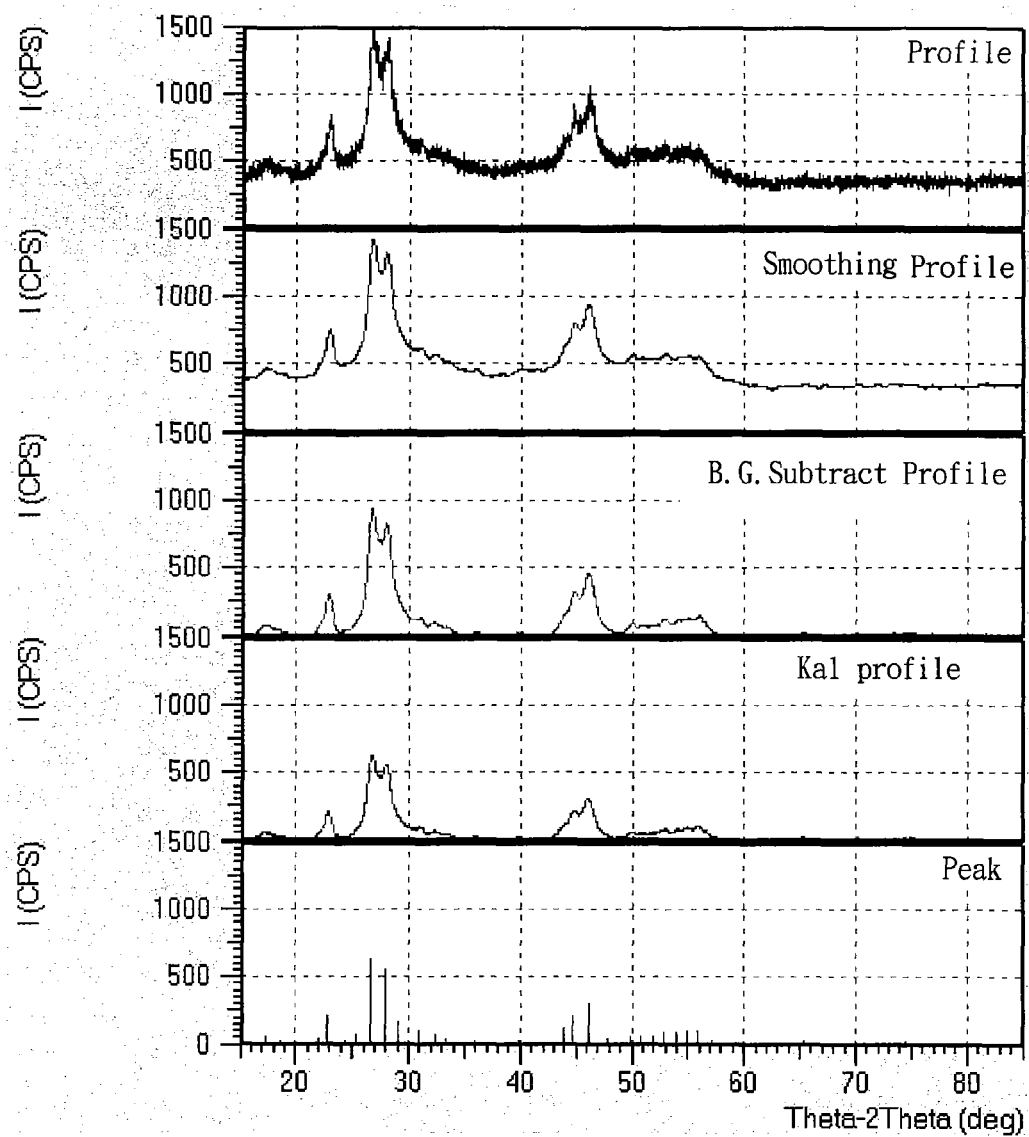
FIG. 10 shows an X-ray diffraction pattern of the product (l) of Example 4 before a post treatment.

Preparation of Ternary Compound CuInSe$_2$ 600 ml of ethylenediamine was added into a reactor. 18.75 g of Se powder was added into the reactor with stirring. The mixture in the reactor was stirred for 5 minutes. 76.24 g of InCl$_3$. 4H$_2$O was added into the reactor with stirring. The mixture was stirred for 20 minutes. 22.64 g of CuCl was added into the reactor with stirring. The mixture was stirred for 20 minutes before heating and was subsequently heated to a boiling point thereof with stirring for reaction of the mixture to take place. The reaction of the mixture lasted under reflux condition for 50 hrs. The mixture was filtered to obtain a crude cake of CuInSe$_2$ after the reaction was completed and the mixture was cooled. The crude cake was washed with a solution containing a large amount of water, 2 L of ethanol and 2 L of acetone, followed by drying at a temperature of 150° C. A black powder (product (l)) of CuInSe$_2$ having a composition of 22.49 at % Cu, 28.99 at % In and 48.51 at % Se was obtained. Elemental analysis shows that the black powder contains an impurity of 9.216 wt % of carbon. FIG. 10 shows the X-ray diffraction (XRD) pattern of the black powder (product (l)).

Removal of Impurity from Product (l)

Figure 11:
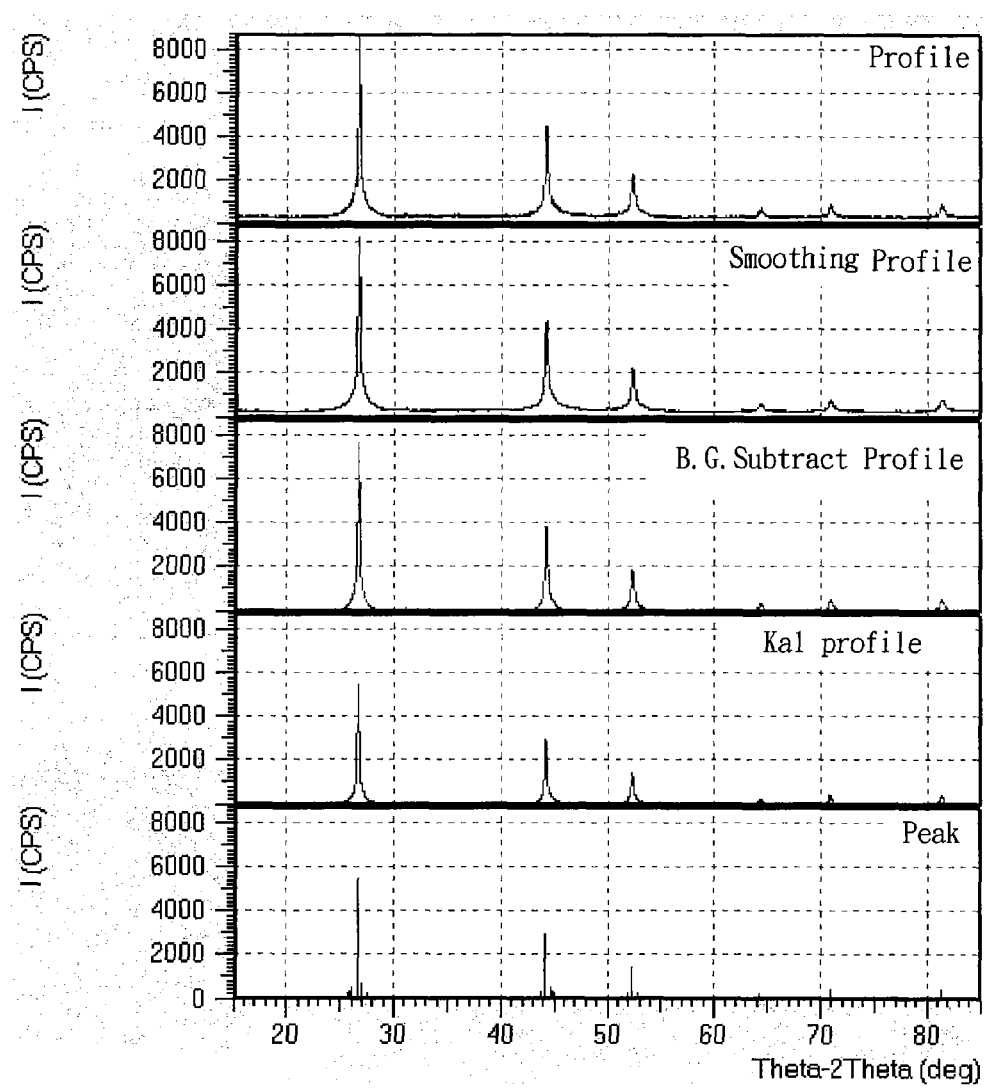
FIG. 11 shows an X-ray diffraction pattern of the product (m) of Example 4 after the post treatment.

600 ml of ethylenediamine was added into a reactor. 50 g of product (l) and 1.37 g of Se powder were added into the reactor with stirring. The mixture in the reactor was stirred for 5 minutes before heating and was subsequently heated to its boiling point with stirring for 40 hrs for conducting a post treatment of the product (l) of the mixture under reflux condition. The mixture was filtered to obtain a crude cake of $CuInSe_2$ after the post treatment was completed and the mixture was cooled. The crude cake was washed with a solution containing a large amount of water, 2 L of ethanol and 2 L of acetone, followed by drying at a temperature of 150° C. A black powder (product (m)) of $CuInSe_2$ having a composition of 22.54 at % Cu, 28.31 at % In, and 49.15 at % Se was obtained. Elemental analysis shows that the black powder contains an impurity of 1.055 wt % of carbon. FIG. 11 shows the X-ray diffraction (XRD) pattern of the black powder (product (m)).

The post treatment of product (l) permits a significant reduction of the carbon content of the $CuInSe_2$ product from 9.216 wt % (product (l)) to 1.055 wt % (product (m)).

Example 5 (E5)

Figure 12:
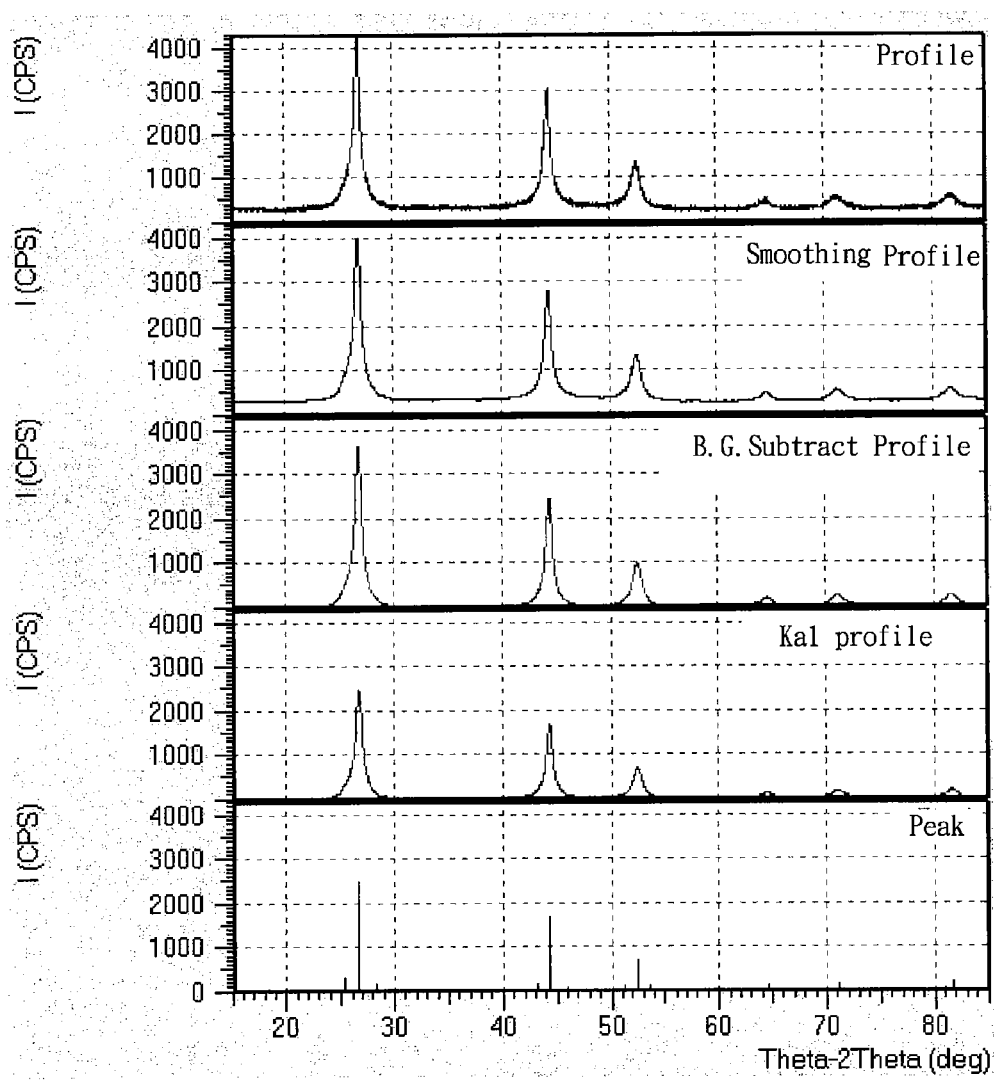
FIG. 12 shows an X-ray diffraction pattern of the product (n) of Example 5 before a post treatment.

Preparation of Ternary Compound $CuInSe_2$ 170 ml of N-methylimidazole was added into a reactor. 16.6 g of $InCl_3$ was added into the reactor with stirring. 18.7 g of $Na_2Se$ powder was slowly added into the reactor with stirring to form a first mixture. 90 ml of N-methylimidazole was added into a second reactor. 7.4 g of CuCl was added into the second reactor with stirring to form a second mixture. The first mixture was cooled to about 3° C., followed by slowly adding the second mixture into the first mixture with stirring while the temperature remained below 5° C. for reaction to take place. The reaction lasted for about 12 hrs. The reaction mixture was filtered to obtain a crude cake of $CuInSe_2$ after the reaction was completed and the mixture was cooled. The crude cake was washed with a solution containing a large amount of water, 2 L of ethanol and 2 L of acetone, followed by drying at a temperature of 150° C. A black powder (product (n)) of $CuInSe_2$ having a composition of 26.02 at % Cu, 26.34 at % In and 47.64 at % Se was obtained. Elemental analysis shows that the black powder contains an impurity of 4.322 wt % of carbon. FIG. 12 shows the X-ray diffraction (XRD) pattern of the black powder (product (n)).

Removal of Impurity from Product (n)

Figure 13:
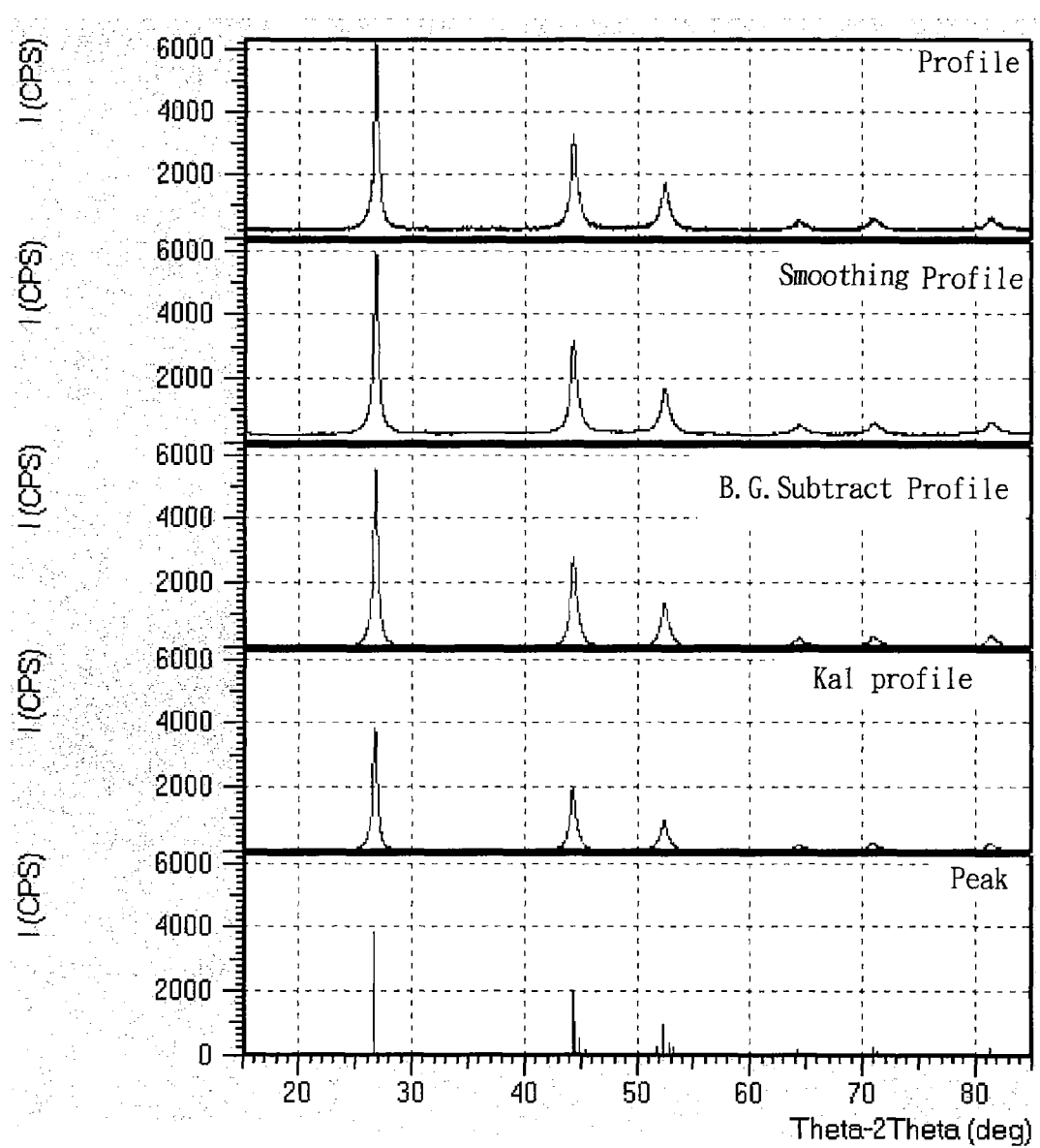
FIG. 13 shows an X-ray diffraction pattern of the product (o) of Example 5 after the post treatment.

80 ml of ethylenediamine was added into a reactor. 9 g of product (n) and 0.25 g of Se powder were added into the reactor with stirring. The mixture in the reactor was stirred for 5 minutes before heating and was subsequently heated to its boiling point with stirring for 45 hrs for conducting a post treatment of the product (n) of the mixture under reflux condition. The mixture was filtered to obtain a crude cake of $CuInSe_2$ after the post treatment was completed and the mixture was cooled. The crude cake was washed with a solution containing a large amount of water, 2 L of ethanol and 2 L of acetone, followed by drying at a temperature of 150° C. A black powder (product (o)) of $CuInSe_2$ having a composition of 25.68 at % Cu, 26.13 at % In, and 48.19 at % Se was obtained. Elemental analysis shows that the black powder contains an impurity of 0.912 wt % of carbon. FIG. 13 shows the X-ray diffraction (XRD) pattern of the black powder (product (o)).

The post treatment of product (n) permits a significant reduction of the carbon content of the $CuInSe_2$ product from 4.322 wt % (product (n)) to 0.912 wt % (product (o)).

Example 6 (E6)

Figure 14:
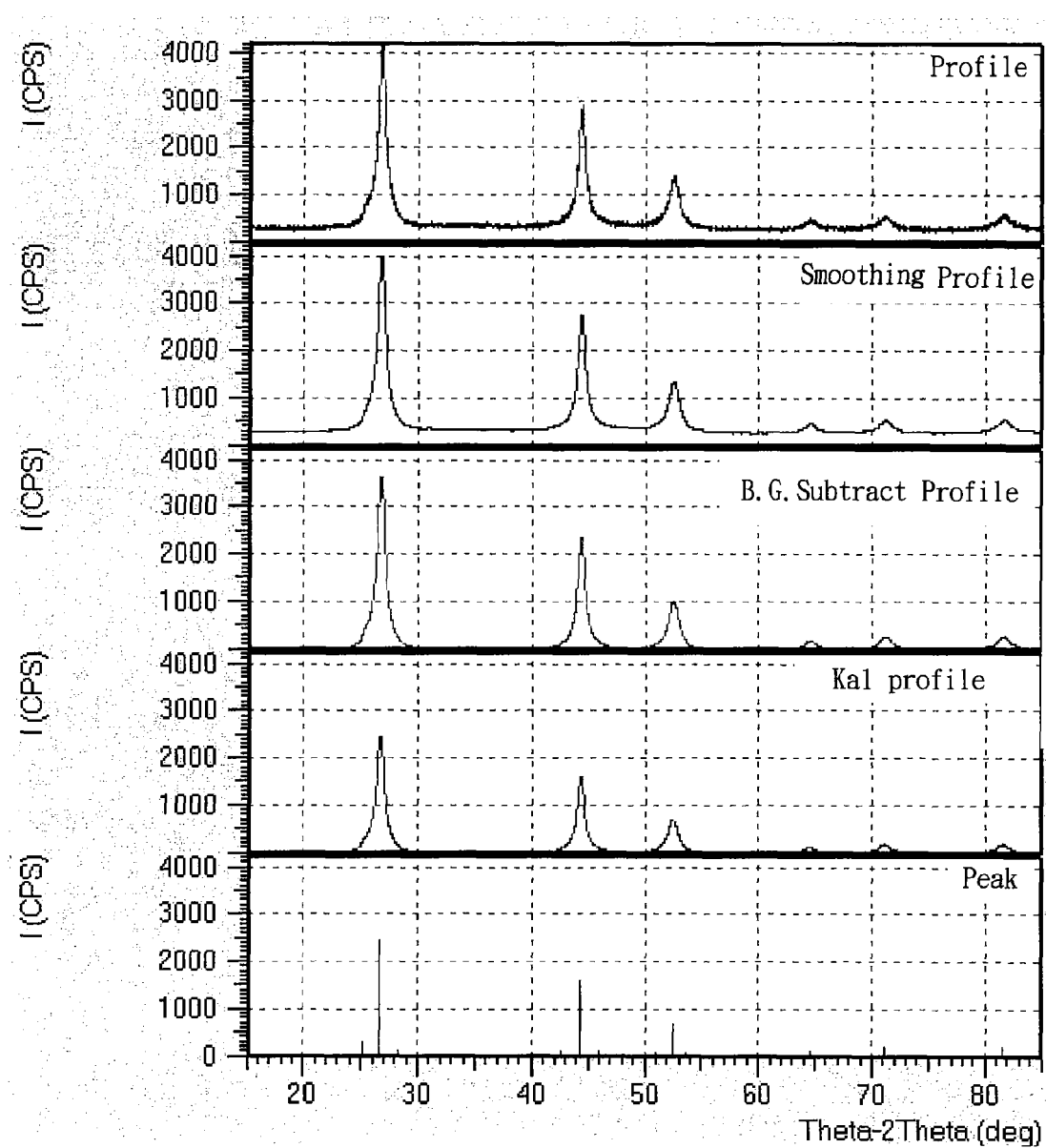
FIG. 14 shows an X-ray diffraction pattern of the product (p) of Example 6 before a post treatment.

Preparation of Quarternary Compound $CuInGaSe_2$ 170 ml of N-methylimidazole was added into a reactor. 14.6 g of $InCl_3$ and 1.58 g of $GaCl_3$ were added into the reactor with stirring. 18.7 g of $Na_2Se$ powder was slowly added into the reactor with stirring to form a first mixture. 90 ml of N-methylimidazole was added into a second reactor. 7.4 g of CuCl was added into the second reactor with stirring to form a second mixture. The first mixture was cooled to about 3° C., followed by slowly adding the second mixture into the first mixture with stirring while the temperature remained below 5° C. for reaction to take place. The reaction lasted for about 12 hrs. The reaction mixture was filtered to obtain a crude cake of $CuInGaSe_2$ after the reaction was completed and the mixture was cooled. The crude cake was washed with a solution containing a large amount of water, 2 L of ethanol and 2 L of acetone, followed by drying at a temperature of 150° C. A black powder (product (p)) of $CuInGaSe_2$ having a composition of 19.4 at % Cu, 21.72 at % In, 7.28 at % Ga, and 51.6 at % Se was obtained. Elemental analysis shows that the black powder contains an impurity of 4.339 wt % of carbon. FIG. 14 shows the X-ray diffraction (XRD) pattern of the black powder (product (p)).

Removal of Impurity from Product (p)

Figure 15:
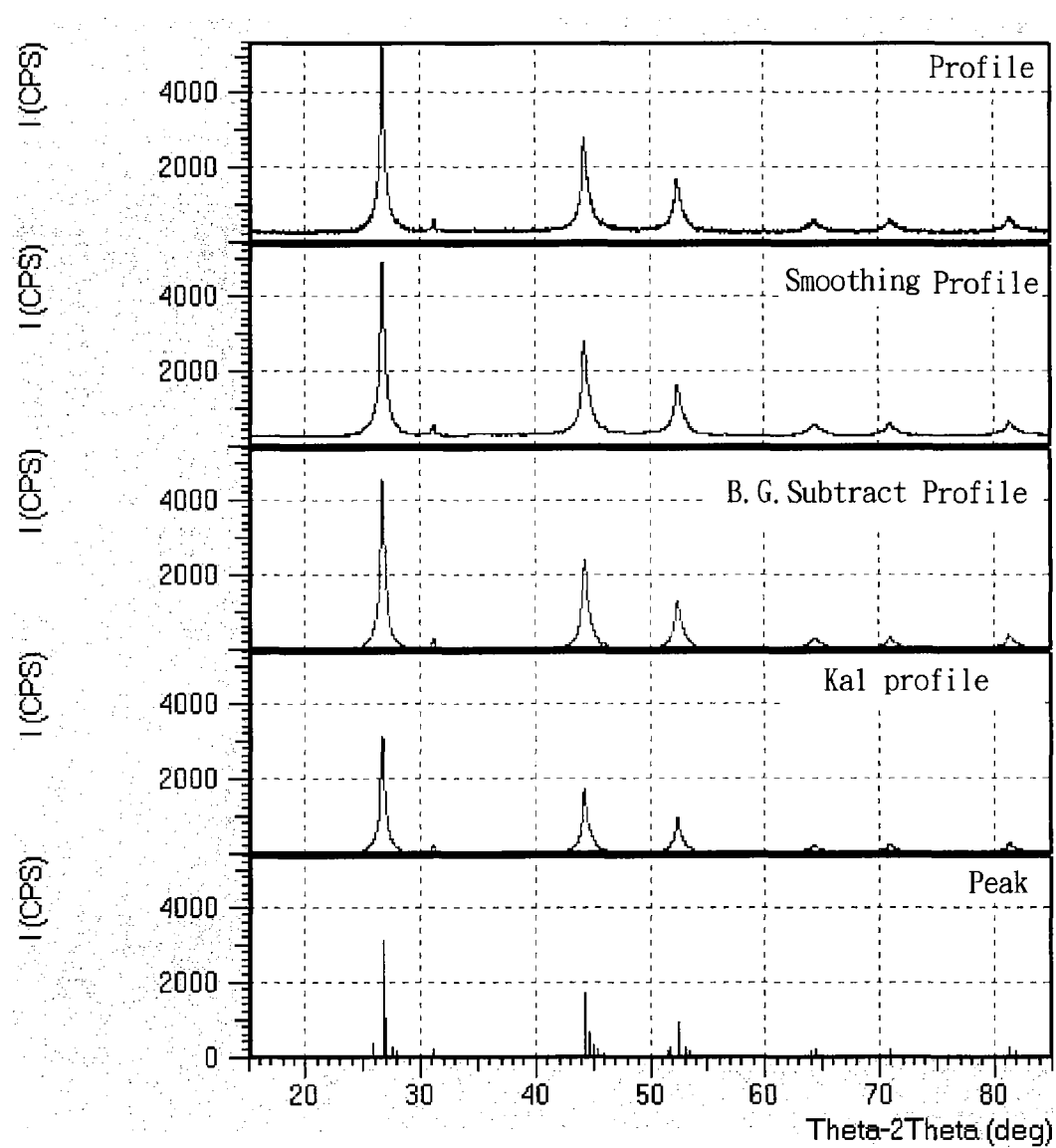
FIG. 15 shows an X-ray diffraction pattern of the product (q) of Example 6 after the post treatment.

105 ml of ethylenediamine was added into a reactor. 12 g of product (p) and 0.33 g of Se powder were added into the reactor with stirring. The mixture in the reactor was stirred for 5 minutes before heating and was subsequently heated to its boiling point with stirring for 40 hrs for conducting a post treatment of the product (p) of the mixture under reflux condition. The mixture was filtered to obtain a crude cake of $CuInGaSe_2$ after the post treatment was completed and the mixture was cooled. The crude cake was washed with a solution containing a large amount of water, 2 L of ethanol and 2 L of acetone, followed by drying at a temperature of 150° C. A black powder (product (q)) of $CuInGaSe_2$ having a composition of 18.42 at % Cu, 22.25 at % In, 7.41 at % Ga, and 51.92 at % Se was obtained. Elemental analysis shows that the black powder contains an impurity of 0.872 wt % of carbon. FIG. 15 shows the X-ray diffraction (XRD) pattern of the black powder (product (q)).

The post treatment of product (p) permits a significant reduction of the carbon content of the product $CuInGaSe_2$ from 4.339 wt % (product (p)) to 0.872 wt % (product (q)).

Example 7 (E7)

Figure 16:
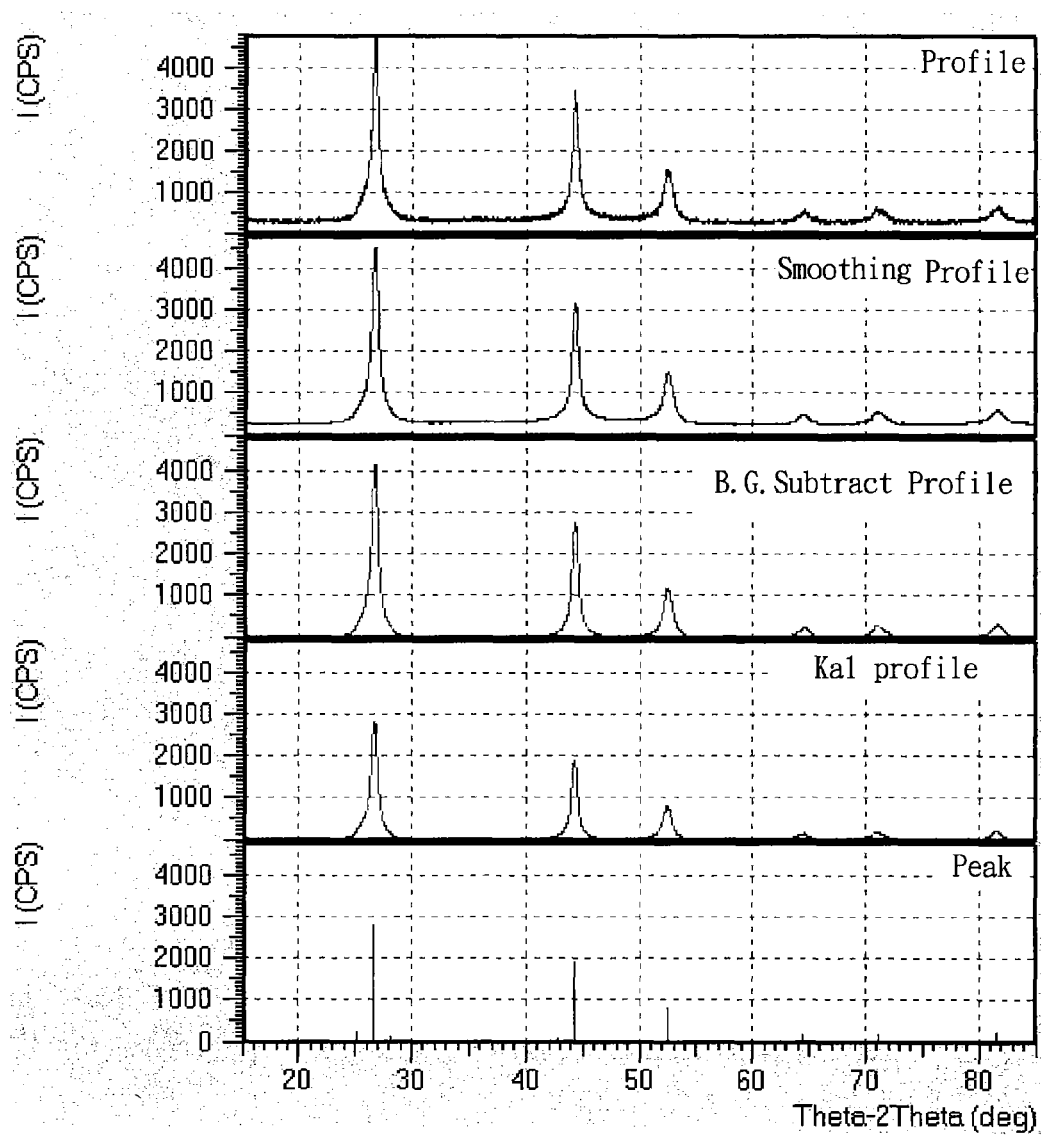
FIG. 16 shows an X-ray diffraction pattern of the product (r) of Example 7 before a post treatment.

Preparation of Five-Element Compound CuInGaSeS 170 ml of N-methylimidazole was added into a reactor. 14.6 g of $InCl_3$ and 1.58 g of $GaCl_3$ were added into the reactor with stirring. 9.37 g of $Na_2Se$ powder and 5.85 g of $Na_2S$ were slowly added into the reactor with stirring to form a first mixture. 90 ml of N-methylimidazole was added into a second reactor. 7.4 g of CuCl was added into the second reactor with stirring to form a second mixture. The first mixture was cooled to about 3° C., followed by slowly adding the second mixture into the first mixture with stirring while the temperature remained below 5° C. for reaction to take place. The reaction lasted for about 12 hrs. The reaction mixture was filtered to obtain a crude cake of CuInGaSeS after the reaction was completed and the mixture was cooled. The crude cake was washed with a solution containing a large amount of water, 1 L of ethanol and 1 L of acetone, followed by drying at a temperature of 150° C. A black powder (product (r)) of CuInGaSeS having a composition of 24.64 at % Cu, 22.1 at % In, 6.98 at % Ga, 25.88 at % Se, and 20.4 at % S was obtained. Elemental analysis shows that the black powder contains an impurity of 2.936 wt % of carbon. FIG. 16 shows the X-ray diffraction (XRD) pattern of the black powder (product (r)).

Removal of Impurity from Product (r)

Figure 17:
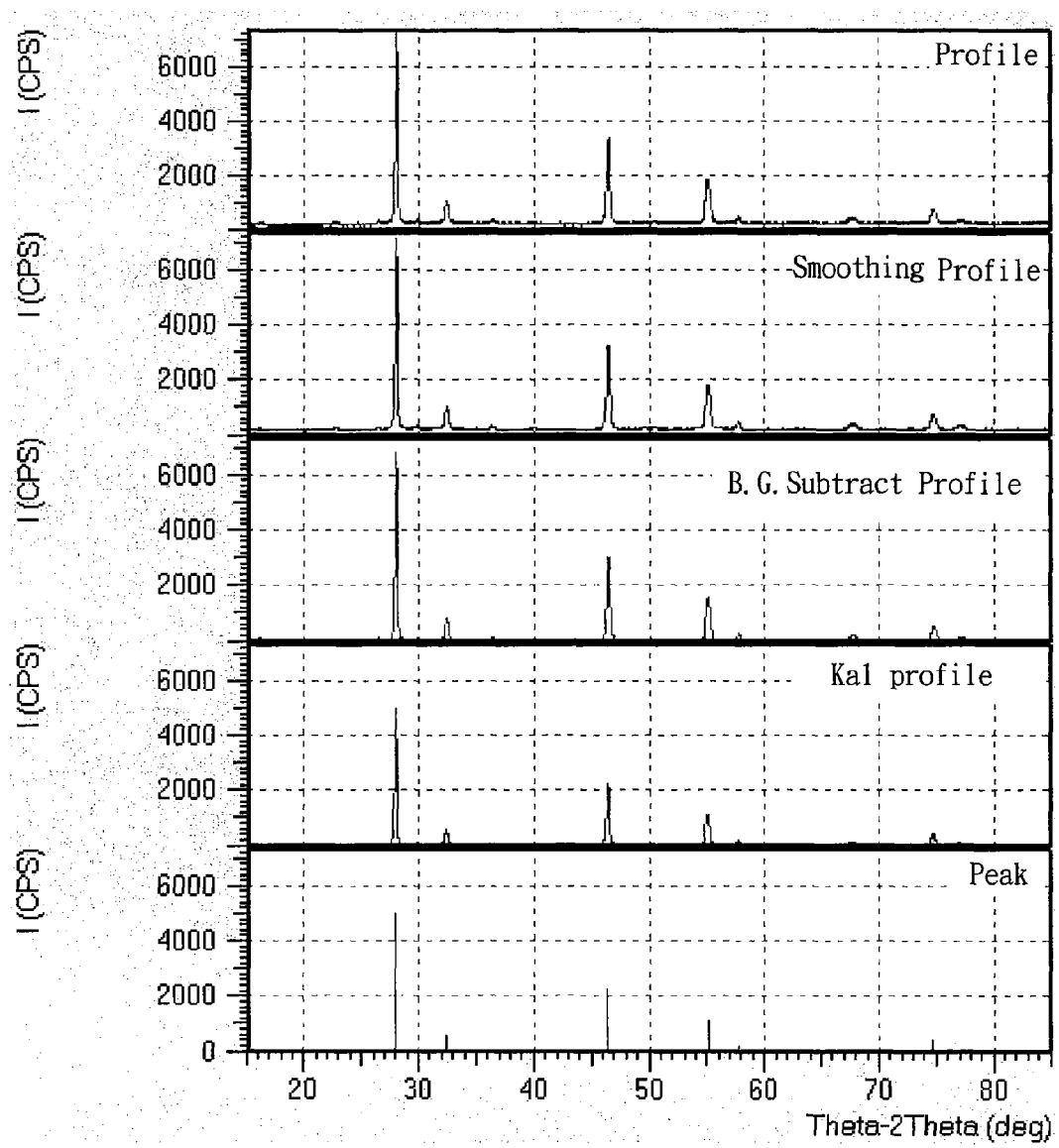
FIG. 17 shows an X-ray diffraction pattern of the product (s) of Example 7 after the post treatment.

90 ml of ethylenediamine was added into a reactor. 10 g of product (r) and 0.28 g of Se powder were added into the reactor with stirring. The mixture in the reactor was stirred for 5 minutes before heating and was subsequently heated to its boiling point with stirring for 40 hrs for conducting a post treatment of the product (r) of the mixture under reflux condition. The mixture was filtered to obtain a crude cake of CuInGaSeS after the post treatment was completed and the mixture was cooled. The crude cake was washed with a solution containing a large amount of water, 2 L of ethanol and 2 L of acetone, followed by drying at a temperature of 150° C. A black powder (product (s)) of CuInGaSeS having a composition of 24.25 at % Cu, 22.1 at % In, 7.11 at % Ga, 26.37 at % Se, and 19.38 at % S was obtained. Elemental analysis shows that the black powder contains an impurity of 0.917 wt % of carbon. FIG. 17 shows the X-ray diffraction (XRD) pattern of the black powder (product (s)).

The post treatment of product (r) permits a significant reduction of the carbon content of the product CuInGaSeS from 2.936 wt % (product (r)) to 0.917 wt % (product (s)).

Example 8 (E8)

Figure 18:
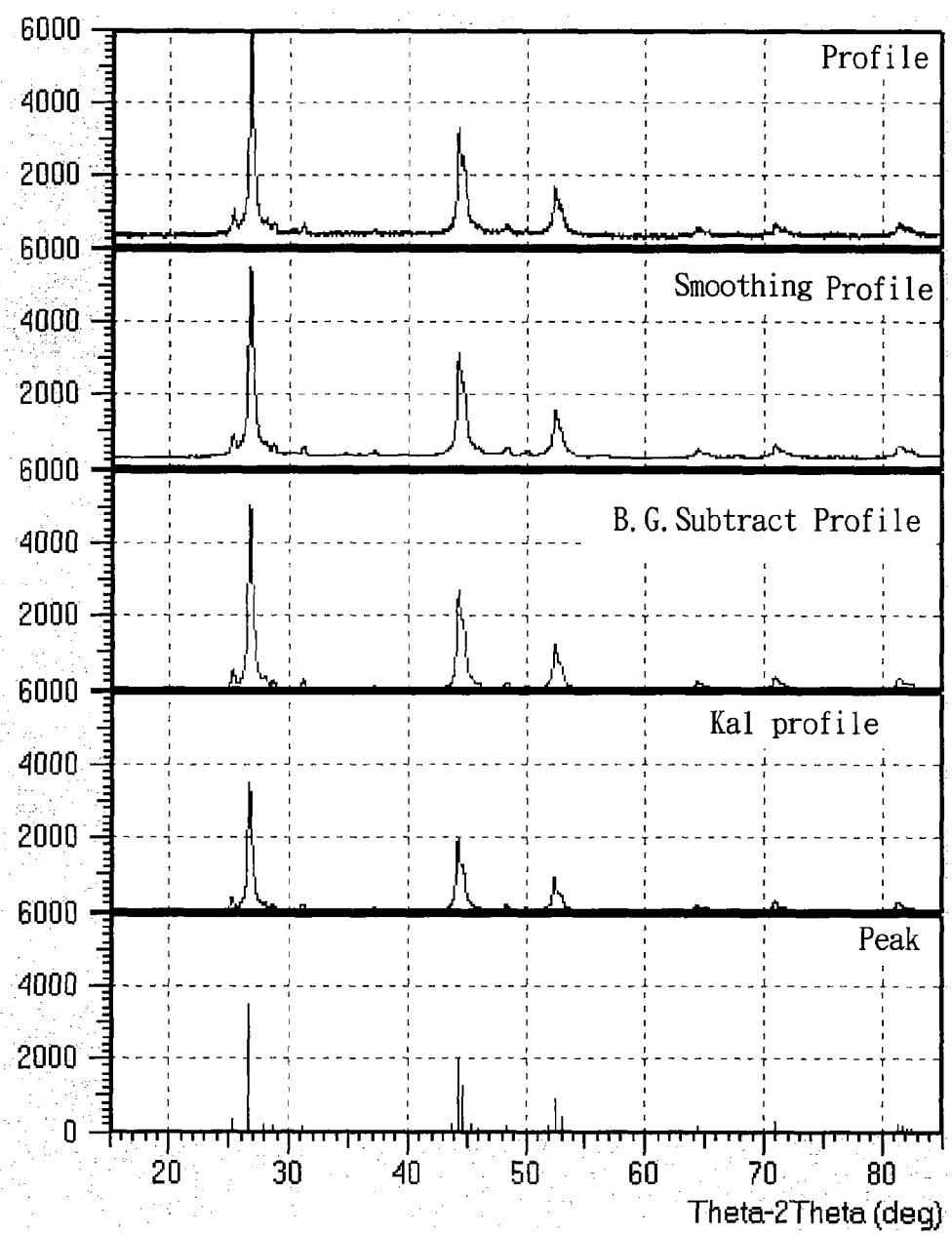
FIG. 18 shows an X-ray diffraction pattern of the product (t) of Example 8 before a post treatment.

Preparation of Five-Element Compound $CuInSe_2$ 150 ml of ethylenediamine was added into a reactor. 2.63 g of Se powder was added into the reactor under stirring. The mixture in the reactor was stirred for 5 minutes. 10.05 g of $In(NO_3)_3$ was added into the reactor under stirring. The mixture was stirred for 15 minutes. 6.9 g of $Cu(NO_3)_2$ was added into the reactor under stirring. The mixture was stirred for 10 minutes and was subsequently heated to a boiling point thereof. The reaction of the mixture was lasted under reflux condition for 45 hrs. The mixture was filtered to obtain a crude cake of $CuInSe_2$ after the reaction was completed and the mixture was cooled. The crude cake was washed with a solution containing a large amount of water, 1 L of ethanol and 1 L of acetone, followed by drying at a temperature of 150° C. A black powder (product (t)) of $CuInSe_2$ having a composition of 25.72 at % Cu, 26.83 at % In and 47.45 at % Se was obtained. Elemental analysis shows that the black powder contains an impurity of 3.255 wt % of carbon. FIG. 18 shows the X-ray diffraction (XRD) pattern of the black powder (product (t)).

Removal of Impurity from Product (t)

Figure 19:
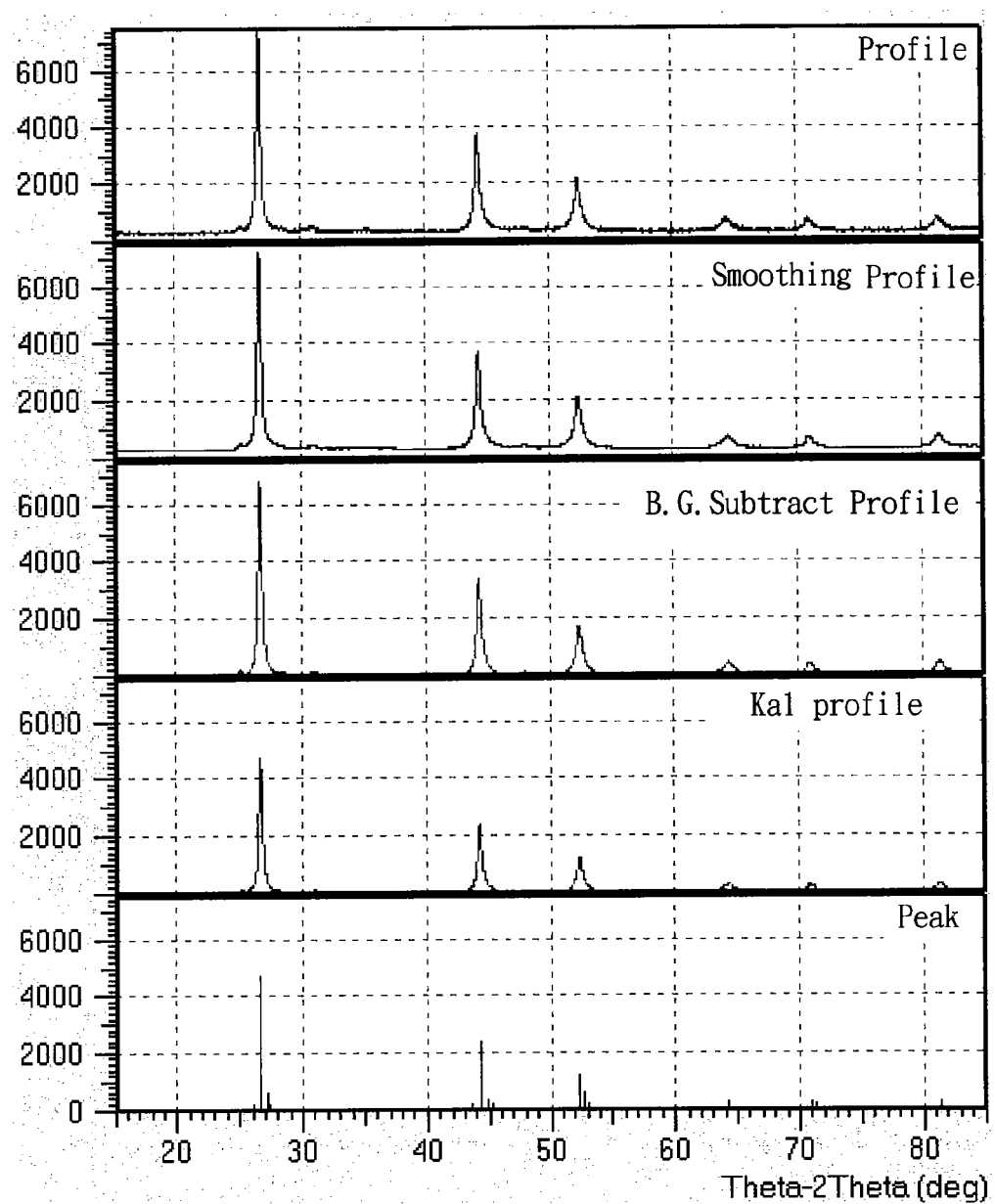
FIG. 19 shows an X-ray diffraction pattern of the product (u) of Example 8 after the post treatment.

80 ml of ethylenediamine was added into a reactor. 10 g of product (t) and 0.28 g of Se powder were added into the reactor under stirring. The mixture in the reactor was stirred for 3 minutes before heating and was subsequently heated to its boiling point under stirring for 45 hrs for conducting a post treatment of the product (t) of the mixture under reflux condition. The mixture was filtered to obtain a crude cake of $CuInSe_2$ after the post treatment was completed and the mixture was cooled. The crude cake was washed with a solution containing a large amount of water, 1 L of ethanol and 1 L of acetone, followed by drying at a temperature of 150° C. A black powder (product (u)) of $CuInSe_2$ having a composition of 25.64 at % Cu, 26.72 at % In, and 47.64 at % Se was obtained. Elemental analysis shows that the black powder contains an impurity of 0.912 wt % of carbon. FIG. 19 shows the X-ray diffraction (XRD) pattern of the black powder (product (u)).

Comparative Example 1 (CE1)

Preparation of Ternary Compound $CuInSe_2$ 700 ml of ethylenediamine was added into a reactor. 12 g of $Cu_2Se$, 27.2 g of $In_2Se_3$ and 2.38 g of Se powder were added into the reactor with stirring. The mixture in the reactor was stirred for 5 minutes before heating and was subsequently heated to a boiling point thereof with stirring for reaction of the mixture to take place. The reaction of the mixture lasted under reflux condition for 55 hrs. The mixture was filtered to obtain a crude cake of $CuInSe_2$ with a relatively large amount of a red fine powder after the reaction was completed and the mixture was cooled. The particle size of the red fine powder was relatively small, which made the filtration of the reaction product and separation of the red fine powder from the crude cake difficult.

Figure 20:
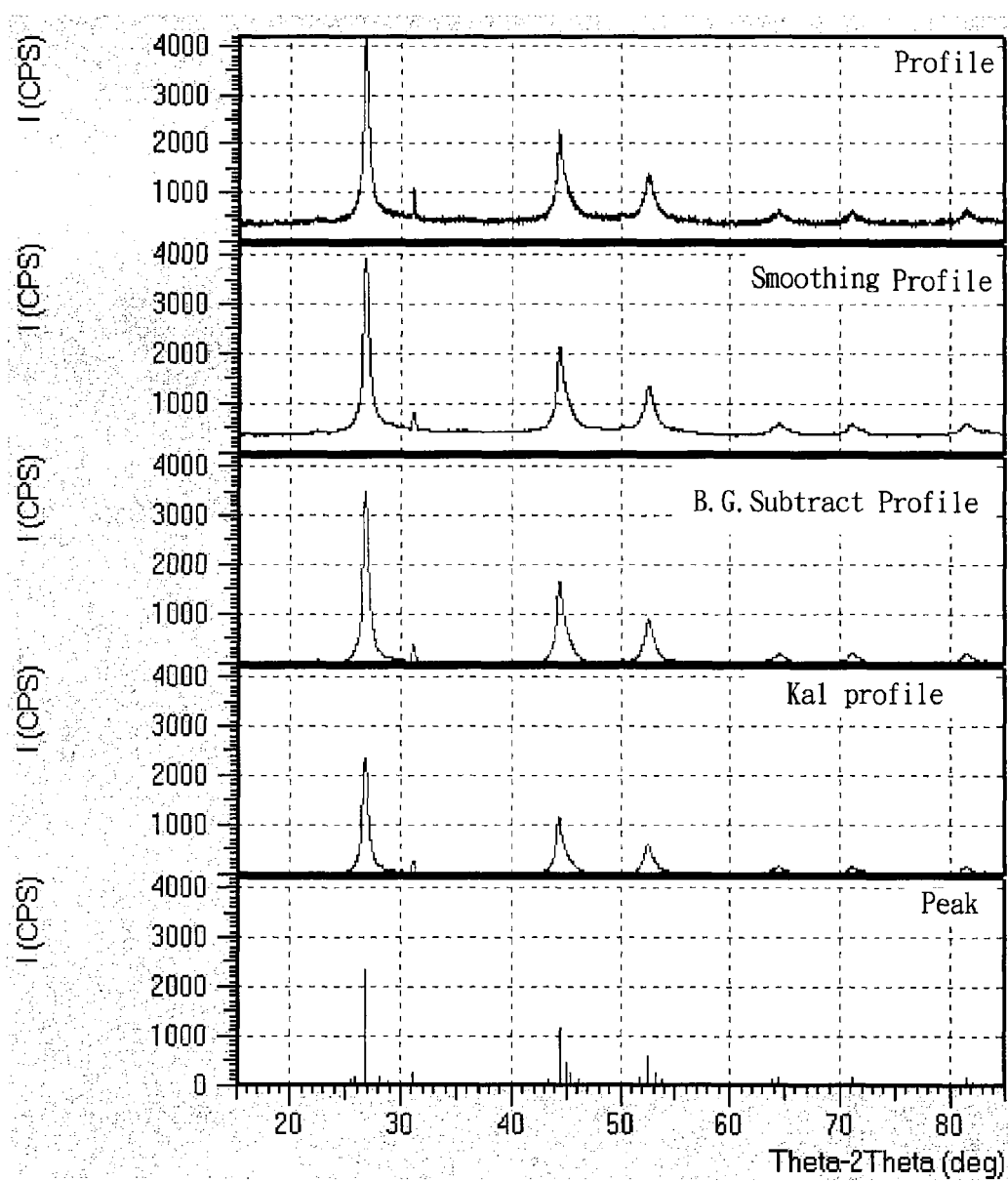
FIG. 20 shows an X-ray diffraction pattern of the product (v) of Comparative Example 1.

The crude cake was washed with a solution containing a large amount of water, 1 L of ethanol and 1 L of acetone, followed by drying at a temperature of 150° C. A black powder (product (v)) of $CuInSe_2$ having a composition of 24.48 at % Cu, 26.8 at % In and 48.72 at % Se was obtained. Elemental analysis shows that the black powder contains an impurity of 2.239 wt % of carbon. FIG. 20 shows the X-ray diffraction (XRD) pattern of the black powder (product (v)).

Comparative Example 2 (CE2)

Figure 21:
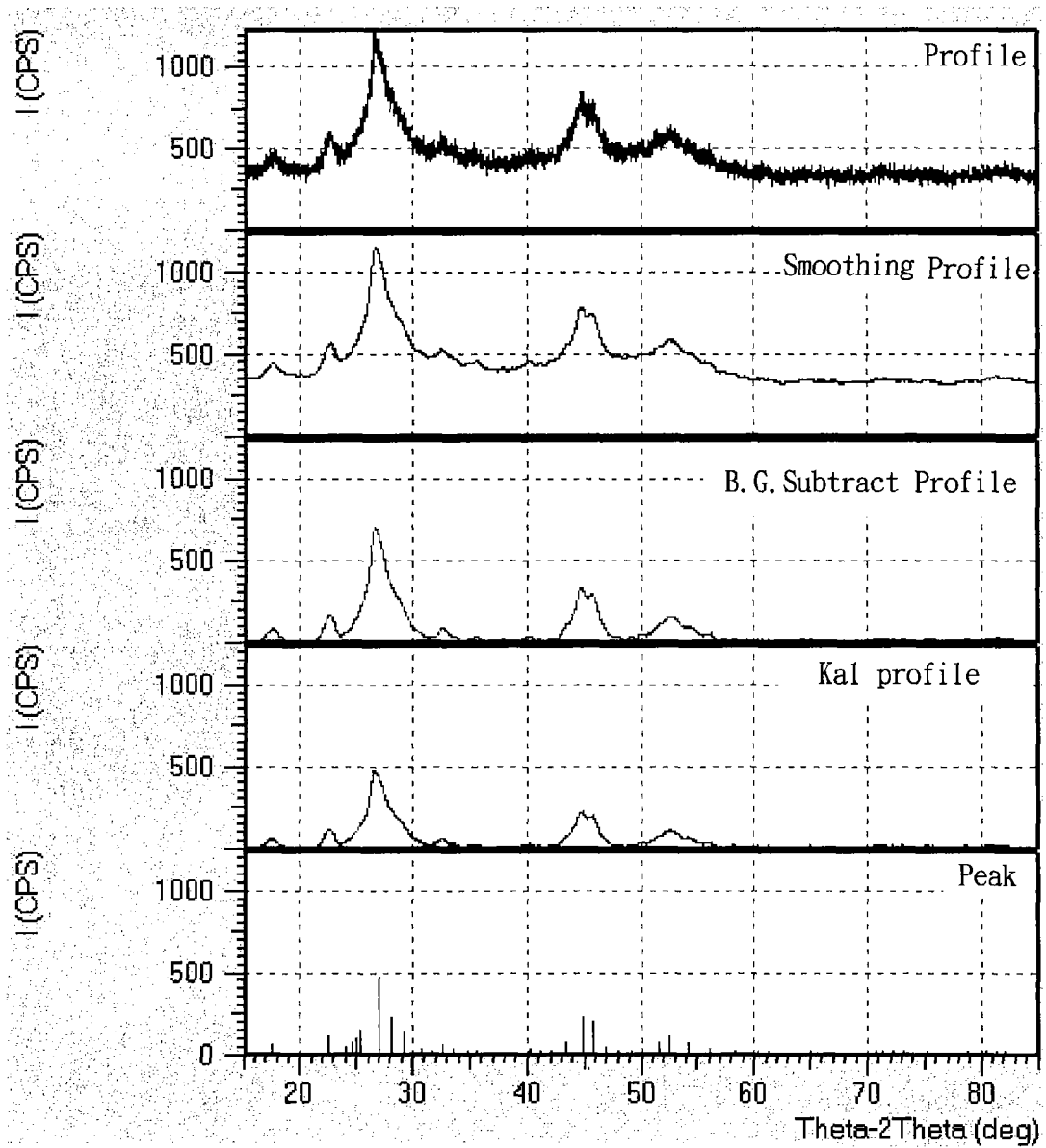
FIG. 21 shows an X-ray diffraction pattern of the product (w) of Comparative Example 2.

Preparation of Ternary Compound $CuInSe_2$ 600 ml of ethylenediamine was added into a reactor. 46.3 g of Se powder was added into the reactor with stirring. The mixture in the reactor was stirred for 5 minutes. 76.24 g of $InCl_3.4H_2O$ was added into the reactor with stirring. The mixture was stirred for 20 minutes. 22.64 g of CuCl was added into the reactor with stirring. The mixture was stirred for 20 minutes before heating and was subsequently heated to a boiling point thereof with stirring for reaction of the mixture to take place. The reaction of the mixture lasted under reflux condition for 50 hrs. The mixture was filtered to obtain a crude cake of $CuInSe_2$ with a relatively large amount of a red fine powder after the reaction was completed and the mixture was cooled. The particle size of the red fine powder was relatively small, which made the filtration of the reaction product and separation of the red fine powder from the crude cake difficult. The crude cake was washed with a solution containing a large amount of water, 1 L of ethanol and 1 L of acetone, followed by drying at a temperature of 150° C. A black powder (product (w)) of $CuInSe_2$ having a composition of 24.37 at % Cu, 28.19 at % In and 47.44 at % Se was obtained. Elemental analysis shows that the black powder contains an impurity of 8.526 wt % of carbon. FIG. 21 shows the X-ray diffraction (XRD) pattern of the black powder (product (w)).

Comparative Example 3 (CE3)

Blank Test: Treating $CuInSe_2$ without Using Se Powder 130 ml of ethylenediamine was added into a reactor. 20 g of $CuInSe_2$ with a carbon content of 1.841 wt % was added into the reactor with stirring. The mixture in the reactor was stirred for 5 minutes before heating and was subsequently heated to its boiling point with stirring under reflux condition for 55 hrs. The mixture was filtered to obtain a crude cake of $CuInSe_2$ after the treatment was completed and the mixture was cooled. The crude cake was washed with a solution containing a large amount of water, 1 L of ethanol and 1 L of acetone, followed by drying at a temperature of 150° C. A black powder (product (x)) of $CuInSe_2$ having a composition of 26.71 at % Cu, 25.59 at % In, and 47.7 at % Se was obtained. Elemental analysis shows that the black powder contains an impurity of 2.012 wt % of carbon.

Figure 22:
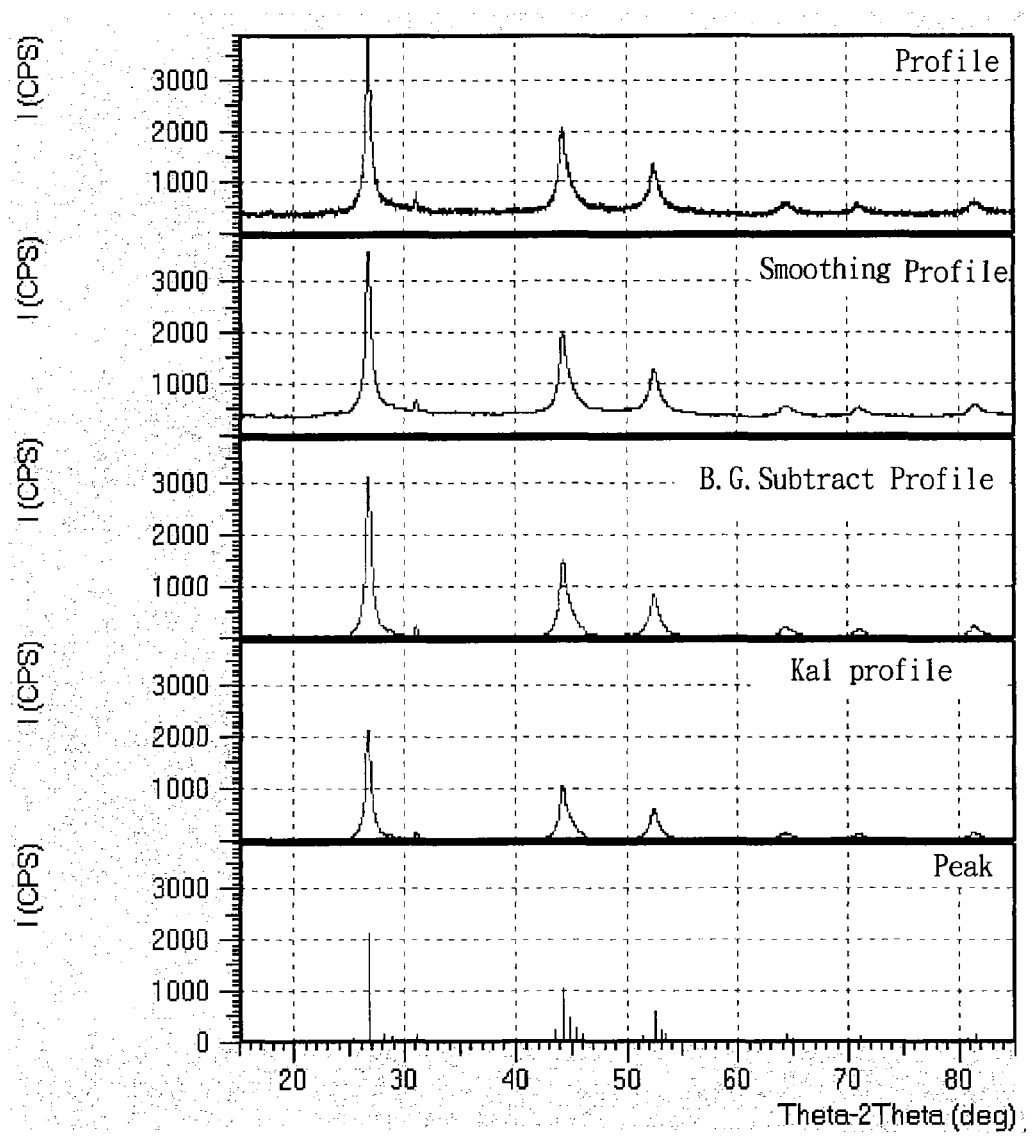
FIG. 22 shows an X-ray diffraction pattern of the product (x) of Comparative Example 3.

FIG. 22 shows the X-ray diffraction (XRD) pattern of the black powder (product (x)).

Comparative Example 1 differs from Example 1 in that an additional amount of the Se powder was added in the reaction mixture of $Cu_2Se$ and $In_2Se_3$ for Comparative Example 1. The results show that the black powder (product (v)) of Comparative Example 1 has a carbon content higher than that obtained before post treatment, i.e., the product (c) of Example 1 and much higher than that obtained after post treatment, i.e., the product (d) of Example 1, which demonstrates that adding an additional amount of the Se powder in the reaction mixture cannot achieve the carbon reduction effect of the post treatment carried out in Example 1.

Comparative Example 2 differs from Example 4 in that an excessive amount of the Se powder was added in the reaction mixture of $Cu_2Se$ and $In_2Se_3$ for Comparative Example 2. The results show that the black powder (product (w)) of Comparative Example 2 has a carbon content slightly less than that obtained before post treatment, i.e., the product (l) of Example 4 and much higher than that obtained after post treatment, i.e., the product (m) of Example 4, which demonstrates that adding an excessive amount of the Se powder in the reaction mixture cannot achieve the carbon reduction effect of the post treatment carried out in Example 4.

Comparative Example 3 differs from the previous Examples 1 and 4 in that the post treatment of $CuInSe_2$ was carried out without the use of the Se powder for Comparative Example 3. The results show that the carbon content of the black powder (product (x)) of Comparative Example 3 is increased after the post treatment, which demonstrates that reduction of the carbon content cannot be achieved without the use of the Se powder in the post treatment.

With the invention thus explained, it is apparent that various modifications and variations can be made without departing from the spirit of the present invention. It is therefore intended that the invention be limited only as recited in the appended claims.

What is claimed is:

1. A method for making a chalcopyrite-type compound, comprising:
   reacting a reaction mixture in a first solvent under reflux condition to form the chalcopyrite-type compound containing $M^1$, $M^2$, and A, in which $M^1$ is selected from Cu, Au, Ag, Na, Li, and K, $M^2$ is selected from In, Ga, Al, Ti, Zn, Cd, Sn, Mg, and combinations thereof, and A is selected from S, Se, Te, and combinations thereof;
   filtering the reaction mixture after the reaction so as to obtain a crude cake of the chalcopyrite-type compound;
   mixing the crude cake with a second solvent and a powder of a post-treatment material selected from S, Se, Te, and combinations thereof so as to form a treatment mixture; and
   heating the treatment mixture under reflux condition in a manner to permit the crude cake to undergo a post treatment for removing impurities from the crude cake.

2. The method of claim 1, wherein each of the first and second solvents is independently selected from alkylamine, dimethyl foramide, N-methylpyrolidone, methylimidazole, dimethyl sulfoxide, oleyamine, glycerol, and ethyleneglycol.

3. The method of claim 2, wherein each of the first and second solvents is independently selected from the group consisting of ethylenediamine and methylimidazole.

4. The method of claim 1, further comprising washing the crude cake with a washing solution containing water, alcohol and ketone before the post-treatment.

5. The method of claim 1, further comprising filtering the treatment mixture after the post-treatment to obtain a treated crude cake, followed by washing the treated crude cake with a washing solution containing water, alcohol and ketone.

6. The method of claim 5, further comprising washing the treated crude cake with an acid.

7. The method of claim 1, wherein the reaction mixture includes at least one first compound and at least one second compound, the first compound containing $M^1$ and $A^1$, the second compound containing $M^2$ and $A^1$, in which $A^1$ is selected from S, Se, Te, $Cl^-$, $Br^-$, $I^-$, $OH^-$, $NO_3^-$, $SO_4^{2-}$, $CH_3COO^-$, acetylacetonate, and combinations of S, Se, and Te; and
   wherein, when $A^1$ of the first and second compounds is $Cl^-$, $Br^-$, $I^-$, $OH^-$, $NO_3^-$, $SO_4^{2-}$, $CH_3COO^-$, acetylacetonate, the reaction mixture further includes a powder of material selected from the group consisting of S, Se, Te, and combinations thereof.

8. The method of claim 7, wherein the reaction mixture includes $Cu_2Se$ and $In_2Se_3$.

9. The method of claim 7, wherein the reaction mixture includes $Cu_2Se$, $In_2Se_3$ and $Ga_2Se_3$.

10. The method of claim 7, wherein the reaction mixture includes $Cu_2Se$, $In_2S_3$, and $Ga_2Se_3$.

11. The method of claim 7, wherein the reaction mixture includes Se, $InCl_3.4H_2O$, and CuCl.

12. The method of claim 7, wherein the reaction mixture includes $InCl_3$, $Na_2Se$, and CuCl.

13. The method of claim 7, wherein the reaction mixture includes $InCl_3$, $GaCl_3$, $Na_2Se$, and CuCl.

* * * * *